(12) United States Patent
Yamaguchi

(10) Patent No.: US 7,031,654 B2
(45) Date of Patent: Apr. 18, 2006

(54) REPEATER, MOBILE RADIO COMMUNICATION SYSTEM, FAULT NOTIFICATION METHOD FOR SAID REPEATER OR SAID MOBILE RADIO COMMUNICATION SYSTEM, AND RECORDING MEDIUM HAVING, RECORDED THEREON, FAULT NOTIFICATION PROGRAM FOR SAID REPEATER OR SAID MOBILE RADIO COMMUNICATION SYSTEM

(75) Inventor: Kazuyuki Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 661 days.

(21) Appl. No.: 09/861,589

(22) Filed: May 22, 2001

(65) Prior Publication Data

US 2001/0044275 A1    Nov. 22, 2001

(30) Foreign Application Priority Data

May 22, 2000   (JP)   ............................. 2000-154414

(51) Int. Cl.
*H04B 3/36*   (2006.01)

(52) U.S. Cl. ...................... 455/7; 455/414.1; 455/418; 455/419; 370/315; 709/219; 709/226

(58) Field of Classification Search ................ 455/419, 455/411, 414.1, 423, 7–11.1, 418; 709/219, 709/226; 703/203; 370/402, 315, 316

See application file for complete search history.

(56) References Cited

U.S. PATENT DOCUMENTS

| 5,613,213 | A | 3/1997 | Naddell et al. |
| 5,917,537 | A | 6/1999 | Lightfoot et al. |
| 6,044,205 | A | 3/2000 | Reed et al. |
| 6,092,111 | A | 7/2000 | Scivier et al. |
| 6,473,609 | B1* | 10/2002 | Schwartz et al. ........... 455/406 |
| 6,601,084 | B1* | 7/2003 | Bhaskaran et al. ......... 718/105 |
| 6,647,260 | B1* | 11/2003 | Dusse et al. ................ 455/419 |

FOREIGN PATENT DOCUMENTS

| JP | 6-68007 | 3/1994 |
| JP | 8-046617 | 2/1996 |
| JP | 8-275240 | 10/1996 |
| JP | 9-167138 | 6/1997 |
| JP | 9-259096 | 10/1997 |
| JP | 10-135962 | 5/1998 |
| JP | 10-257050 | 9/1998 |
| JP | 11-25059 | 1/1999 |
| JP | 11-68823 | 3/1999 |
| NZ | 301420 | 7/1998 |
| WO | WO 98/00784 | 1/1998 |
| WO | 98/34422 | 8/1998 |
| WO | WO 00/02403 | 1/2000 |

\* cited by examiner

*Primary Examiner*—Nay Maung
*Assistant Examiner*—Raymond Dean
(74) *Attorney, Agent, or Firm*—Young & Thompson

(57) ABSTRACT

A contents server fault monitor periodically detects the status of operation of contents servers. Information about the status of operation of the contents servers is held in a server operation database. When an inactive contents server has been detected through look-up of the operation status information, a service menu is prepared that is a list of services which can be provided by active contents servers. Upon a request for the acquisition of a service from a portable terminal, the prepared service menu is sent to the portable terminal. By virtue of this construction, prior to the connection of a portable terminal to a network, a periodically prepared service menu, that indicates only services of contents servers which can provide services, is presented to the portable terminal.

38 Claims, 26 Drawing Sheets

FIG. 3

"SERVICE-CONTENTS
SERVER CORRESPONDENCE"

| SERVICE SPECIFYING INDENTIFIER | CONTENTS SERVER ID |
|---|---|
| (URL) | 101 |
| (URL) | 102 |
| (URL) | 102 |
| ⋮ | ⋮ |
| (URL) | xxx |

FIG. 4

"CONTENTS SERVER STATE MANAGEMENT TABLE"

| CONTENTS SERVER ID | CONTENTS SERVER ADDRESS | STATUS OF OPERATION |
|---|---|---|
| 101 | (IP ADDRESS) | 0 (INACTIVE) |
| 102 | (IP ADDRESS) | 1 (ACTIVE) |
| ‥ | (IP ADDRESS) | ‥ |
| xxx | (IP ADDRESS) | x |

FIG. 10

"SERVICE STATE MANAGEMENT TABLE"

| SERVICE SPECIFYING IDENTIFIER | CONTENTS SERVER ADDRESS | SERVICE STATUS |
|---|---|---|
| (URL) | (IP ADDRESS) | 0 (UNDER SUSPENSION) |
| (URL) | (IP ADDRESS) | 1 (UNDER SERVICE) |
| (URL) | (IP ADDRESS) | 1 (UNDER SERVICE) |
| . . | . . | . . |
| (URL) | (IP ADDRESS) | x |

"PUSH CYCLE MANAGEMENT TABLE"

| TERMINAL ID | PUSH CYCLE |
|---|---|
| PHONE NUMBER | (TIME) |
| ⋮ | ⋮ |
| ⋮ | ⋮ |

FIG. 17

"INDIVIDUAL MENU ADDITION SERVICE MANAGEMENT TABLE"

| TERMINAL ID | PUSH CYCLE | INDIVIDUAL MENU ADDITION SERVICE |
|---|---|---|
| PHONE NUMBER | (TIME) | (YES/NO) |
| ⋮ | ⋮ | ⋮ |
| ⋮ | ⋮ | ⋮ |

FIG. 18

"TERMINAL REGISTRATION SERVICE MANAGEMENT TABLE"

| SERVICE SPECIFYING IDENTIFIER / TERMINAL ID | URL NO. 1 | URL NO. 2 | ········ | URL NO. n |
|---|---|---|---|---|
| PHONE NUMBER | URL | URL | ········ | URL |
| ⋮ | ⋮ | ⋮ | ········ | ⋮ |
| ⋮ | ⋮ | ⋮ | ········ | ⋮ |

REPEATER, MOBILE RADIO COMMUNICATION SYSTEM, FAULT NOTIFICATION METHOD FOR SAID REPEATER OR SAID MOBILE RADIO COMMUNICATION SYSTEM, AND RECORDING MEDIUM HAVING, RECORDED THEREON, FAULT NOTIFICATION PROGRAM FOR SAID REPEATER OR SAID MOBILE RADIO COMMUNICATION SYSTEM

FIELD OF THE INVENTION

The invention relates to a repeater, a mobile radio communication system, a fault notification method for said repeater or said mobile radio communication system, and a recording medium having, recorded thereon, a fault notification program for said repeater or said mobile radio communication system, and more particularly to a repeater, a mobile radio communication system, a fault notification method for said repeater or said mobile radio communication system, and a recording medium having, recorded thereon, a fault notification program for said repeater or said mobile radio communication system, which can prevent unnecessary access to a network.

BACKGROUND OF THE INVENTION

In recent years, a system has been proposed wherein a portable terminal accesses a contents server present on a network (particularly the Internet) to fetch information from the network.

FIG. 27 shows the construction of a system wherein a portable terminal M accesses a contents server S present on a network.

As shown in FIG. 27, in order to achieve the access from the portable terminal M to the contents server S present on the network, a specialty server called a gateway server G is disposed at a point of access to the network.

The gateway server G is connected to the portable terminal M through a radio communication channel. The communication through the radio communication channel is performed, for example, using a communication protocol called WAP (wireless application protocol) optimized for the characteristics of wireless and portable terminals. On the other hand, communication between the contents servers S present on the network and the gateway server G is performed based on a standard protocol of this network [for example, in the case of the Internet, standard protocols for the Internet, such as HTTP (hyper-text transfer protocol) or TCP (transmission control protocol)].

The gateway server G has the function of performing protocol conversion between the communication protocol in the radio communication channel and the standard protocol in the network on which the contents server S is present, the function of converting data, for example, the function of, when information held in the contents server on the network is a document written in the form of HTML (hypertext markup language), converting the document in the HTML form to a document in a WML (wireless application language) form used in WAP, and the function of, for example, when the document held in the contents server S on the network is a WML document in a text form, converting WML document to a binary form to compress the data.

Next, a method for access from a portable terminal M to a contents server S on a network in a mobile communication system having the above construction will be explained in conjunction with FIG. 28.

At the outset, when the power of the portable terminal M is turned on, the positional information of the portable terminal M is cataloged in a positional information database P through the nearest base station. Next, when a call is made from the portable terminal M to the phone number of a previously cataloged access point, connection between the portable terminal M and a gateway server G carrying this access point is established.

In the request for access to a contents server S, a method may be used wherein the request for access is notified in a suitable radio communication protocol, for example, HTTP or WAP, to the gateway server G, and a contents server S can be selected and designated, for example, by URL (uniform resource locator).

In a mobile communication system having the above construction, however, even when the contents server S has suffered from fault such as down and thus cannot provide a service to the user of the portable terminal M, the user cannot previously learn the fault before an attempt to access the contents server S from the portable terminal M.

For this reason, when the user of the portable terminal M has made a request for access to the contents server S suffering from fault, the user can learn the inactive state of the service provided by the contents server S only through a phenomenon of access time-out in the portable terminal M caused by a failure of response from the contents server S. The access time-out takes place in two cases, that is, the case where the number of requests for access to the contents server is too large to access the contents server, and the case where the contents server suffers from fault. The user cannot judge whether the access time-out is attributable to the excessively large requests for access to the contents server or to the down of the contents server. Therefore, the user can learn the down of the contents server only after a large number of attempts to access the contents server. This leads to loss of a lot of time.

In order to solve this problem, Japanese Patent Laid-Open No. 249249/1996 (prior art 1) proposes a message repeater and a message repeating method.

Specifically, the prior art 1 proposes a message repeater for a relay of a message between at least one client for sending a request message and at least one server for receiving the contents of the request message and sending a message respondent to the request message, said message repeater comprising: management means for managing the state of the server; and control means for controlling the relay of the message based on the contents of the management means.

The management means comprises: a dialog identifying information storage means which uniquely identifies a message respondent to a request message and, in addition, stores dialog identification information for distinguishing the client as the requester from the send destination server and, when a request for cataloging or deletion of the dialog identification information has been issued, catalogs or deletes the dialog identification information; and a server state monitor means which monitors the state of each server and, when fault of a server has been detected, sets the state of the server, which is managed within this means, as fault and makes an instruction for the response of a message of fault to the request message regarding the dialog identification information for the fault server.

Further, Japanese Patent Laid-Open No. 214545/1997 (prior art 2), which is relevant to the invention in the technical field, proposes a network communication control system.

Specifically, the prior art 2 discloses a composite network system wherein a plurality of networks connecting a plurality of stations to each other are connected to each other through a connecting device, said connecting device comprising: connection control means for controlling send/receive of data between the plurality of connected networks; network monitor means which monitors the state of the stations connected to the plurality of networks to collect the information of the status of the stations; state information storage means for holding the state information collected by the network monitor means; judgment means which reads the state information stored in the state information storage means to judge whether or not the send destination of data sent from each station is normal; fault notification means which, when the data send destination station has been judged by the send judgment means to be abnormal, sends a fault response to the data sender station; send failure station address storage means which, when the data send destination station has been judged by the send judgment means to be abnormal, stores the address of data send destination station and the address of the sender station; undelete judgment means which, based on an instruction from the network monitor means, judges, from information stored in the state information storage means and the send failure station address storage means, whether or not the data send destination station has been undeleted; and undelete notification means which, when the data send destination station has been judged by the undelete judgment means to be in an undelete state, sends an undelete response to the data sender station.

In both the above prior art techniques, however, the terminal side can recognize only the state of the server, to which the access has been requested by the terminal, and cannot recognize the state of other servers on the network.

Further, in both the above prior art techniques, until the terminal makes a request for access to a predetermined contents server, the gateway server does not send, to the terminal, information about whether or not the designated contents server is down.

Therefore, before the send of a request for access, the terminal side cannot previously recognize the state of contents servers present on the network. Thus, for the user of the portable terminal, wasteful communication takes place, and, hence, the user should pay wasteful communication charge. On the other hand, for the system side, wasteful line connection disadvantageously lowers line utilization.

SUMMARY OF THE INVENTION

Under the above circumstances, the invention has been made, and it is an object of the invention to provide a repeater, a fault notification method for the repeater, and a recording medium having, recorded thereon, a fault notification program for the repeater, which can previously notify portable terminals of the operation status of contents servers to prevent wasteful communication.

The above object can be attained by the following features.

(1) A repeater for a protocol conversion of a communication protocol in a network, in which contents servers for providing service are present, and a radio communication protocol in a radio communication channel which portable terminals utilize, said repeater comprising:

detection means for periodically detecting the status of operation of the contents servers present on the network;

first storage means for holding information about the status of operation of the contents servers detected by the detection means; and service menu preparation means which performs the search of the first storage means and, when an inactive contents server has been detected, prepares a service menu which can recognize services provided by active contents servers, wherein upon a request from a portable terminal for the acquisition of a service provided by a contents server, the service menu prepared by the service menu preparation means is sent to the portable terminal.

(2) A repeater for a protocol conversion of a communication protocol in a network, in which contents servers for providing services are present, and a radio communication protocol in a radio communication channel which portable terminals utilize, said repeater comprising:

detection means for detecting an implementation status indicating whether or not services realized by data held in the contents servers are in a providable or acquisitive state;

first storage means for holding information about the implementation status of the services detected by the detection means; and service menu preparation means which performs the search of the first storage means and, when a service, in a state such that the service cannot be acquired or provided, has been detected, prepares a service menu which can recognize acquisitive and providable services, wherein upon a request from a portable terminal for the acquisition of a service provided by a contents server, the service menu prepared by the service menu preparation means is sent to the portable terminal.

(3) A repeater for a protocol conversion of a communication protocol in a network, in which contents servers for providing service are present, and a radio communication protocol in a radio communication channel which portable terminals utilize, said repeater comprising:

detection means for periodically detecting the status of operation of the contents servers present on the network;

first storage means for holding information about the status of operation of the contents servers detected by the detection means;

service menu preparation means which performs the search of the first storage means and, when an inactive contents server has been detected, prepares a service menu which can recognize services provided by active contents servers;

time-counting means for counting the timing of distribution of the service menu prepared by the service menu preparation means to the portable terminals; and push distribution means for push-distributing the service menu to the portable terminal for which a predetermined time has been counted by the time-counting means.

(4) A repeater for a protocol conversion of a communication protocol in a network, in which contents servers for providing services are present, and a radio communication protocol in a radio communication channel which portable terminals utilize, said repeater comprising:

detection means for detecting an implementation status indicating whether or not services realized by data held in the contents server are in a providable or acquisitive state;

first storage means for holding information about the implementation status of the services detected by the detection means;

service menu preparation means which performs the search of the first storage means and, when a service not in an acquisitive or providable state has been detected, prepares a service menu which can recognize acquisitive and providable services;

time-counting means for counting the timing of distribution of the service menu prepared by the service menu preparation means to the portable terminals; and push distribution means for push-distributing the service menu to the portable terminal for which a predetermined time has been counted by the time-counting means.

(5) The repeater according to the above item (1) or (2), which further comprises:

time-counting means that has a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table; and push distribution means for push-distributing the service menu prepared by the service menu preparation means to the portable terminal which has been judged by the time-counting means to be in the timing of distribution of the service menu.

(6) The repeater according to the above item (1) or (2), which further comprises:

time-counting means that has a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table;

second storage means which, for each portable terminal cataloged in the management table, records, in association with each other, information for identifying portable terminals and specifying information for specifying services of which the implementation status is to be notified as a service menu to the portable terminal; and push distribution means that, upon the receipt, from the time-counting means, of the notification of the portable terminal being in the timing of the distribution of the service menu, refers to the second storage means, acquires from the second storage means the specifying information for specifying services of which the implementation status is to be notified as the service menu to the portable terminal, refers to the first storage means based on the acquired specifying information, acquires from the first storage means the implementation status of the services indicated by the specifying information to prepare a service menu, and then push-distributes the prepared service menu to the portable terminal notified by the time-counting means.

(7) A repeater for a protocol conversion of a communication protocol in a network, in which contents servers for providing services are present, and a radio communication protocol in a radio communication channel which portable terminals utilize, said repeater comprising:

detection means for detecting an implementation status indicating whether or not services realized by data held in the contents server are in a providable or acquisitive state;

first storage means for holding information about the implementation status of the services detected by the detection means;

service menu preparation means which performs the search of the first storage means and, when a service not in an acquisitive or providable state has been detected, prepares a service menu which can recognize acquisitive and providable services; and control means for controlling each means in such a manner that, upon a request for the acquisition of a service, provided by the contents server, from the portable terminal, sends the service menu prepared by the service menu preparation means to the portable terminal, wherein upon the receipt of a request from the portable terminal for access, wherein the service provided by the contents server has been designated, the control means refers to the first storage means to detect the implementation status of the designated service and, when the designated service is not in a providable or acquisitive state, sends a service menu, which summarizes the implementation status of other services belonging to the same genre as the designated service, to the portable terminal which has requested the access.

(8) A mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, wherein the contents server has notification means that, when a service realized by data held in the contents server is inactive, notifies the repeater of the inactive state of the service together with specifying information for specifying the service, and the repeater comprises receive means for receiving information notified by the notification means, first storage means for holding information about the implementation status of each service received by the receive means, and service menu preparation means which performs the search of the first storage means and, when a service not in a providable state has been detected, prepares a service menu which can recognize providable services, wherein upon a request from the portable terminal for the acquisition of a service provided by a contents server, the service menu prepared by the service menu preparation means is sent to the portable terminal.

(9) A mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, wherein the contents server has notification means that, when a service realized by data held in the contents server is inactive, notifies the repeater of the inactive state of the service together with specifying information for specifying the service, and the repeater comprises receive means for receiving information notified by the notification means, first storage means for holding information about the implementation status of each service received by the receive means, and service menu preparation means which performs the search of the first storage means and, when a service not in a providable state has been detected, prepares a service menu which can recognize providable services, time-counting means for counting the timing of distribution of the service menu prepared by the service menu preparation means to the portable terminals, and push distribution means for push-distributing the service menu to the portable terminal for which a predetermined time has been counted by the time-counting means.

(10) The mobile radio communication system according to the above item (8), which further comprises:

time-counting means that has a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table; and push distribution means for push-distributing the service menu prepared by the service menu preparation means to the portable terminal which has been judged by the time-counting means to be in the timing of distribution of the service menu.

(11) The mobile radio communication system according to the above item (8), which further comprises:

time-counting means that has a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table;

second storage means which, for each portable terminal cataloged in the management table, records, in association with each other, information for identifying the portable terminal and specifying information for specifying services of which the implementation status is to be notified as a service menu to the portable terminal; and push distribution means that, upon the receipt, from the time-counting means, of the notification of the portable terminal being in the timing of the distribution of the service menu, refers to the second storage means, acquires from the second storage means the specifying information for specifying services of which the implementation status is to be notified as the service menu to the portable terminal, refers to the first storage means based on the acquired specifying information, acquires from the first storage means the implementation status of the services indicated by the specifying information to prepare a service menu, and then push-distributes the prepared service menu to the portable terminal notified by the time-counting means.

(12) A mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, wherein the contents server has notification means that, when a service realized by data held in the contents server is inactive, notifies the repeater of the inactive state of the service together with specifying information for specifying the service, and the repeater comprises receive means for receiving information notified by the notification means, first storage means for holding information about the implementation status of each service received by the receive means, service menu preparation means which performs the search of the first storage means and, when a service not in a providable state, has been detected, prepares a service menu which can recognize providable services, and control means for controlling each means in such a manner that, upon a request for the acquisition of a service, provided by the contents server, from the portable terminal, sends the service menu prepared by the service menu preparation means to the portable terminal, wherein upon the receipt of a request from the portable terminal for access, wherein the service provided by the contents server has been designated, the control means refers to the first storage means to detect the implementation status of the designated service and, when the designated service is not in a providable state, sends a service menu, which summarizes the implementation status of other services belonging to the same genre as the designated service, to the portable terminal which has requested the access.

(13) A fault notification method for a repeater for a protocol conversion of a communication protocol in a network, in which contents servers for providing services are present, and a radio communication protocol in a radio communication channel which portable terminals utilize, said method comprising the steps of:

periodically detecting the status of operation of the contents servers present on the network (detection step);

storing in first storage means information about the status of operation of the contents servers detected by the detection step (store step);

searching the first storage means for the status of operation of the contents servers (search step);

when an inactive contents server has been detected by the search step, preparing a service menu which can recognize services provided by active contents servers (first service menu preparation step); and upon a request from a portable terminal for the acquisition of a service provided by a contents server, sending the service menu prepared by the first service menu preparation step to the portable terminal (send step).

(14) A fault notification method for a repeater for a protocol conversion of a communication protocol in a network, in which contents servers for providing services are present, and a radio communication protocol in a radio communication channel which portable terminals utilize, said method comprising the steps of:

detecting an implementation status indicating whether or not services realized by data held in the contents servers are in a providable or acquisitive state (detection step);

storing in first storage means information about the implementation status of the services detected by the detection step (store step);

searching the first storage means for the implementation status of each service (search step);

when a service not in an acquisitive or providable state has been detected by the search step, preparing a service menu which can recognize acquisitive and providable services (first service menu preparation step); and upon a request from a portable terminal for the acquisition of a service provided by a contents server, sending the service menu prepared by the first service menu preparation step to the portable terminal (send step).

(15) A fault notification method for a repeater for a protocol conversion of a communication protocol in a network, in which contents servers for providing services are present, and a radio communication protocol in a radio communication channel which portable terminals utilize, said method comprising the steps of:

periodically detecting the status of operation of the contents servers present on the network (detection step);

storing in first storage means information about the status of operation of the contents servers detected by the detection step (store step);

searching the first storage means for the status of operation of the contents servers (search step);

when an inactive contents server has been detected by the search step, preparing a service menu which can recognize services provided by active contents servers (first service menu preparation step);

counting the timing of distribution of the service menu prepared by the first service menu preparation step to the portable terminals (time-counting step); and push-distributing the service menu to the portable terminal for which a predetermined time has been counted by the time-counting step (push distribution step).

(16) A fault notification method for a repeater for a protocol conversion of a communication protocol in a network, in which contents servers for providing services are present, and a radio communication protocol in a radio communication channel which portable terminals utilize, said method comprising the steps of:

detecting whether or not services realized by data held in the contents servers are in a providable or acquisitive state (detection step);

storing in first storage means information about the status of the services detected by the detection step (store step);

searching the first storage means for the implementation status of each service (search step);

when a service not in an acquisitive or providable state has been detected by the search step, preparing a service menu which can recognize acquisitive and providable services (first service menu preparation step);

counting the timing of distribution of the service menu prepared by the first service menu preparation step to the portable terminals (time-counting step); and push-distributing the service menu to the portable terminal for which a predetermined time has been counted by the time-counting step (push distribution step).

(17) The fault notification method according to the above item (13) or (14), which further comprises the steps of:

providing a management table, which records, in association with each other, information for identifying a portable terminal, to which the service menu is push-distributed, and a cycle of the distribution of the service menu to the portable terminal, and counting the timing of the distribution of the service menu to portable terminals cataloged in the management table (time-counting step); and push-distributing the service menu prepared by the first service menu preparation step to the portable terminal which has been judged by the time-counting step to be in the timing of distribution of the service menu (push distribution step).

(18) The fault notification method according to the above item (13) or (14), which further comprises the steps of:

providing a management table, which records, in association with each other, information for identifying a portable terminal, to which the service menu is push-distributed, and a cycle of the distribution of the service menu to the portable terminal, and counting the timing of the distribution of the service menu to portable terminals cataloged in the management table (time-counting step);

upon the receipt, from the time-counting step, of the notification of the portable terminal being in the timing of the distribution of the service menu, looking up second storage means, which, for each portable terminal cataloged in the management table, records, in association with each other, information for identifying the portable terminal and specifying information for specifying services of which the implementation status is to be notified as a service menu to the portable terminal, and acquiring from the second storage means the specifying information for specifying services of which the implementation status is to be notified as the service menu to the portable terminal (acquisition step);

looking up the first storage means based on the specifying information acquired by the acquisition step and acquiring from the first storage means the implementation status of the services indicated by the specifying information to prepare a service menu (second service menu preparation step); and push-distributing the service menu prepared by the second service menu preparation step to the portable terminal notified by the time-counting step (push distribution step).

(19) A fault notification method for a repeater for a protocol conversion of a communication protocol in a network, in which contents servers for providing services are present, and a radio communication protocol in a radio communication channel which portable terminals utilize, said method comprising the steps of:

detecting an implementation status indicating whether or not services realized by data held in the contents servers are in a providable or acquisitive state (detection step);

storing in first storage means information about the implementation status of the services detected by the detection step (store step);

searching the first storage means for the implementation status of each service (search step);

when a service not in an acquisition or providable state has been detected by the search step, preparing a service menu which can recognize acquisitive and providable services (first service menu preparation step);

upon the receipt of a request from a portable terminal for access, wherein the service provided by the contents server has been designated, looking up the first storage means to detect the implementation status of the designated service (second detection step);

when the result of the detection by the second detection step is such that the designated service is not in a providable or acquisitive state, preparing a service menu, which summarizes the implementation status of other services belonging to the same genre as the designated service (third service menu preparation step); and sending the service menu prepared by the third service menu preparation step to the portable terminal which has requested the access (second send step).

(20) A fault notification method for a mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, said method comprising the steps of:

when a service realized by data held in the contents server is inactive, notifying the repeater of the inactive state of the service together with specifying information for specifying the service (notification step);

receiving in the repeater information notified by the notification step (receive step);

storing in first storage means information about the implementation status of each service received by the receive step (store step);

searching the first storage means for the implementation status of each service (search step);

when a service not in a providable state has been detected by the search step, preparing a service menu which can recognize providable services (first service menu preparation step); and upon a request from a portable terminal for the acquisition of a service provided by a contents server, sending the service menu prepared by the first service menu preparation step to the portable terminal (send step).

(21) A fault notification method for a mobile radio communication system comprising:

portable terminals for performing communication through a radio communication channel;

contents servers which are present on a network and stores information; and a repeater for a protocol conversion of a communication protocol in a network, in which the contents servers are present, and a radio communication protocol in a radio communication channel which the portable terminals utilize, said method comprising the steps of:

when a service realized by data held in the contents server is inactive, notifying the repeater of the inactive state of the service together with specifying information for specifying the service (notification step);

receiving in the repeater information notified by the notification step (receive step);

storing in first storage means information about the implementation status of each service received by the receive step (store step);

searching the first storage means for the implementation status of each service (search step);

when a service not in a providable state has been detected by the search step, preparing a service menu which can recognize providable services (first service menu preparation step);

counting the timing of distribution of the service menu prepared by the first service menu preparation step to the portable terminal (time-counting step); and push-distributing the service menu to the portable terminal for which a predetermined time has been counted by the time-counting step (push distribution step).

(22) The fault notification method for mobile radio communication system according to the above item (20), which further comprises the steps of:

providing a first management table, which records, in association with each other, information for identifying a portable terminal, to which the service menu is push-distributed, and a cycle of the distribution of the service menu to the portable terminal, and counting the timing of the distribution of the service menu to portable terminals cataloged in the first management table (time-counting step); and push-distributing the service menu prepared by the first service menu preparation step to the portable terminal which has been judged by the time-counting step to be in the timing of distribution of the service menu (push distribution step).

(23) The fault notification method for mobile radio communication system according to the above item (20), which further comprises the steps of:

providing a management table, which records, in association with each other, information for identifying a portable terminal, to which the service menu is push-distributed, and a cycle of the distribution of the service menu to the portable terminal, and counting the timing of the distribution of the service menu to portable terminals cataloged in the management table (time-counting step);

upon the receipt, from the time-counting step, of the notification of the portable terminal being in the timing of the distribution of the service menu, looking up second storage means, which, for each portable terminal cataloged in the management table, records, in association with each other, information for identifying the portable terminal and specifying information for specifying services of which the implementation status is to be notified as a service menu to the portable terminal, and acquiring from the second storage means the specifying information for specifying services of which the implementation status is to be notified as the service menu to the portable terminal (acquisition step);

looking up the first storage means based on the specifying information acquired by the acquisition step and acquiring from the first storage means the implementation status of the services indicated by the specifying information to prepare a service menu (second service menu preparation step); and push-distributing the service menu prepared by the second service menu preparation step to the portable terminal notified by the time-counting step (push distribution step).

(24) A fault notification method for a mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, said method comprising the steps of:

when a service realized by data held in the contents server is inactive, notifying the repeater of the inactive state of the service together with specifying information for specifying the service (notification step);

receiving in the repeater information notified by the notification step (receive step);

storing in first storage means information about the implementation status of each service received by the receive step (store step);

searching the first storage means for the implementation status of each service (search step);

when a service, in a state such that the service cannot be acquired or provided, has been detected by the search step, preparing a service menu which can recognize acquisitive and providable services (first service menu preparation step);

upon the receipt of a request from a portable terminal for access, wherein the service provided by the contents server has been designated, looking up the first storage means to detect the implementation status of the designated service (second detection step);

when the result of the detection by the second detection step is such that the designated service is not in a providable or acquisitive state, preparing a service menu, which summarizes the implementation status of other services belonging to the same genre as the designated service (third service menu preparation step); and sending the service menu prepared by the third service menu preparation step to the portable terminal which has requested the access (second send step).

(25) A recording medium having, recorded thereon, a fault notification program for a repeater for a protocol conversion of a communication protocol in a network, in which contents servers for providing service are present, and a radio communication protocol in a radio communication channel which portable terminals utilize, said recording medium having, recorded thereon, a program for executing:

detection processing for periodically detecting the status of operation of the contents servers present on the network;

store processing for storing in first storage means information about the status of operation of the contents servers detected by the detection processing;

search processing for searching the first storage means for the status of operation of the contents servers;

first service menu preparation processing which, when an inactive contents server has been detected by the search processing, prepares a service menu which can recognize services provided by active contents servers; and send processing which, upon a request from a portable terminal for the acquisition of a service provided by a contents server, sends the service menu prepared by the first service menu preparation processing to the portable terminal.

(26) A recording medium having, recorded thereon, a fault notification program for a repeater for a protocol conversion of a communication protocol in a network, in which contents servers for providing services are present, and a radio communication protocol in a radio communication channel which portable terminals utilize, said recording medium having, recorded thereon, a program for executing:

detection processing for detecting an implementation status indicating whether or not services realized by data held in the contents server are in a providable or acquisitive state;

store processing for storing in first storage means information about the implementation status of the services detected by the detection processing;

search processing for searching the first storage means for the implementation status of each service;

first service menu preparation processing which, when a service not in an acquisitive or providable state has been detected by the search processing, prepares a service menu which can recognize acquisitive and providable services; and send processing which, upon a request from a portable terminal for the acquisition of a service provided by a contents server, sends the service menu prepared by the first service menu preparation processing to the portable terminal.

(27) A recording medium having, recorded thereon, a fault notification program for a repeater for a protocol conversion of a communication protocol in a network, in which a contents servers for providing services are present, and a radio communication protocol in a radio communication channel which a portable terminals utilize, said recording medium having, recorded thereon, a program for executing:

detection processing for periodically detecting the status of operation of the contents servers present on the network;

store processing for storing in first storage means information about the status of operation of the contents servers detected by the detection processing;

search processing for searching the first storage means for the status of operation of the contents servers;

first service menu preparation processing which, when an inactive contents server has been detected by the search processing, prepares a service menu which can recognize services provided by active contents servers;

time-counting processing for counting the timing of distribution of the service menu prepared by the first service menu preparation processing to the portable terminals; and push distribution processing for push-distributing the service menu to the portable terminal for which a predetermined time has been counted by the time-counting processing.

(28) A recording medium having, recorded thereon, a fault notification program for a repeater for a protocol conversion of a communication protocol in a network, in which contents servers for providing services are present, and a radio communication protocol in a radio communication channel which portable terminals utilize, said recording medium having, recorded thereon, a program for executing:

detection processing for detecting whether or not services realized by data held in the contents server are in a providable or acquisitive state;

store processing for storing in first storage means information about the status of the services detected by the detection processing;

search processing for searching the first storage means for the implementation status of each service;

first service menu preparation processing which, when a service not in an acquisitive or providable state has been detected by the search processing, prepares a service menu which can recognize acquisitive or providable services;

time-counting processing for counting the timing of distribution of the service menu prepared by the first service menu preparation processing to the portable terminals; and push distribution processing for push-distributing the service menu to the portable terminal for which a predetermined time has been counted by the time-counting processing.

(29) The recording medium having, recorded thereon, a fault notification program for a repeater according to the above item (25) or (26), wherein said program further executes:

time-counting processing which refers to a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table; and push distribution processing for push-distributing the service menu prepared by the first service menu preparation processing to the portable terminal which has been judged by the time-counting processing to be in the timing of distribution of the service menu.

(30) The recording medium having, recorded thereon, a fault notification program for a repeater according to the above item (25) or (26), wherein said program further executes:

time-counting processing which refers to a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table;

acquisition processing which, upon the receipt, from the time-counting processing, of the notification of the portable terminal being in the timing of the distribution of the service menu, looking up second storage means, which, for each portable terminal cataloged in the management table, records, in association with each other, information for identifying the portable terminal and specifying information for specifying services of which the implementation status is to be notified as a service menu to the portable terminal, and acquiring from the second storage means the specifying information for specifying services of which the implementation status is to be notified as the service menu to the portable terminal;

second service menu preparation processing which looks up the first storage means based on the specifying information acquired by the acquisition processing and acquires from the first storage means the implementation status of the services indicated by the specifying information to prepare a service menu; and push distribution processing for push-distributing the service menu prepared by the second service menu preparation processing to the portable terminal notified by the time-counting processing.

(31) A recording medium having, recorded thereon, a fault notification program for a repeater for a protocol conversion of a communication protocol in a network, in which contents servers for providing services are present, and a radio communication protocol in a radio communication channel which portable terminals utilize, said recording medium having, recorded thereon, a program for executing:

detection processing for detecting an implementation status indicating whether or not services realized by data held in the contents server are in a providable or acquisitive state;

store processing for storing in first storage means information about the implementation status of the services detected by the detection processing;

search processing for searching the first storage means for the implementation status of each service;

first service menu preparation processing which, when a service not in an acquisitive or providable state has been detected by the search processing, prepares a service menu which can recognize acquisitive and providable services;

second detection processing which, upon the receipt of a request from a portable terminal for access, wherein the service provided by the contents server has been designated, looks up the first storage means to detect the implementation status of the designated service;

third service menu preparation processing which, when the designated service detected by the second detection processing is not in a providable or acquisitive state, prepares a service menu, which summarizes the implementation status of other services belonging to the same genre as the designated service; and second send processing for sending the service menu prepared by the third service menu preparation processing to the portable terminal which has requested the access.

(32) A recording medium having, recorded thereon, a fault notification program for a mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, said recording medium having, recorded thereon, a program for executing:

notification processing which, when a service realized by data held in the contents server is inactive, notifies the repeater of the inactive state of the service together with specifying information for specifying the service;

receive processing for receiving in the repeater information notified by the notification processing;

store processing for storing in first storage means information about the implementation status of each service received by the receive processing;

search processing for searching the first storage means for the implementation status of each service;

first service menu preparation processing which, when a service not in a providable state has been detected by the search processing, prepares a service menu which can recognize providable services; and send processing which, upon a request from a portable terminal for the acquisition of a service provided by a contents server, sends the service menu prepared by the first service menu preparation processing to the portable terminal.

(33) A recording medium having, recorded thereon, a fault notification program for a mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, said recording medium having, recorded thereon, a program for executing:

notification processing which, when a service realized by data held in the contents server is inactive, notifies the repeater of the inactive state of the service together with specifying information for specifying the service;

receive processing for receiving in the repeater information notified by the notification processing;

store processing for storing in first storage means information about the implementation status of each service received by the receive processing;

search processing for searching the first storage means for the implementation status of each service;

first service menu preparation processing which, when a service not in a providable state has been detected by the search processing, prepares a service menu which can recognize providable services;

time-counting processing for counting the timing of distribution of the service menu prepared by the first service menu preparation processing to the portable terminals; and push distribution processing for push-distributing the service menu to the portable terminal for which a predetermined time has been counted by the time-counting processing.

(34) The recording medium having, recorded thereon, a fault notification program for a mobile radio communication system according to the above item (32), wherein the program further executes:

time-counting processing which refers to a first management table, which records, in association with each other, information for identifying a portable terminal, to which the service menu is push-distributed, and a cycle of the distribution of the service menu to the portable terminal, and counts the timing of the distribution of the service menu to portable terminals cataloged in the first management table; and push distribution processing for push-distributing the service menu prepared by the first service menu preparation processing to the portable terminal which has been judged by the time-counting processing to be in the timing of distribution of the service menu.

(35) The recording medium having, recorded thereon, a fault notification program for a mobile radio communication system according to the above item (32), wherein the program further executes:

time-counting processing which refers to a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table;

acquisition processing which, upon the receipt, from the time-counting processing, of the notification of the portable terminal being in the timing of the distribution of the service menu, looks up second storage means, which, for each portable terminal cataloged in the management table, records, in association with each other, information for identifying the portable terminal and specifying information for specifying services of which the implementation status is to be notified as a service menu to the portable terminal, and acquires from the second storage means the specifying information for specifying services of which the implementation status is to be notified as the service menu to the portable terminal;

second service menu preparation processing which looks up the first storage means based on the specifying information acquired by the acquisition processing and acquires from the first storage means the implementation status of the services indicated by the specifying information to prepare a service menu; and push distribution processing for push-distributing the service menu prepared by the second service menu preparation processing to the portable terminal notified by the time-counting processing.

(36) A recording medium having, recorded thereon, a fault notification program for a mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, said recording medium having, recorded thereon, a program for executing:

notification processing which, when a service realized by data held in the contents server is inactive, notifies the repeater of the inactive state of the service together with specifying information for specifying the service;

receive processing for receiving in the repeater information notified by the notification processing;

store processing storing in first storage means information about the implementation status of each service received by the receive processing;

search processing for searching the first storage means for the implementation status of each service;

first service menu preparation processing which, when a service not in an acquisitive or providable state has been detected by the search processing, prepares a service menu which can recognize acquisitive and providable state;

second detection processing which, upon the receipt of a request from a portable terminal for access, wherein the service provided by the contents server has been designated, looks up the first storage means to detect the implementation status of the designated service;

third service menu preparation processing which, when the result of the detection by the second detection processing is such that the designated service is not in a providable or acquisitive state, prepares a service menu, which summarizes the implementation status of other services belonging to the same genre as the designated service; and second send processing for sending the service menu prepared by the third service menu preparation processing to the portable terminal which has requested the access.

BRIEF DESCRIPTION OF THE DRAWINGS

The invention will be explained in more detail in conjunction with the appended drawings, wherein:

FIG. 3 is a diagram showing the construction of a service-contents server correspondence management table held in a server operation database;

FIG. 4 is a diagram showing the construction of a contents server state management table held in a server operation database;

FIG. 10 is a diagram showing the construct ion of a service state management table held in a server operation database;

FIG. 17 is a diagram showing the construction of an individual menu addition service management table held in an access service management section;

FIG. 18 is a diagram showing the construction of a terminal registration service management table held in a user management database;

DESCRIPTION OF THE PREFERRED EMBODIMENTS

Preferred embodiments of a repeater, a mobile radio communication system, a fault notification method for the repeater and a fault notification method for the mobile radio communication system, and a recording medium having, recorded thereon, a fault notification program for the repeater and a recording medium having, recorded thereon, a fault notification program for the mobile radio communication system according to the invention will be explained in detail in conjunction with FIGS. 1 to 26.

Figure 1:
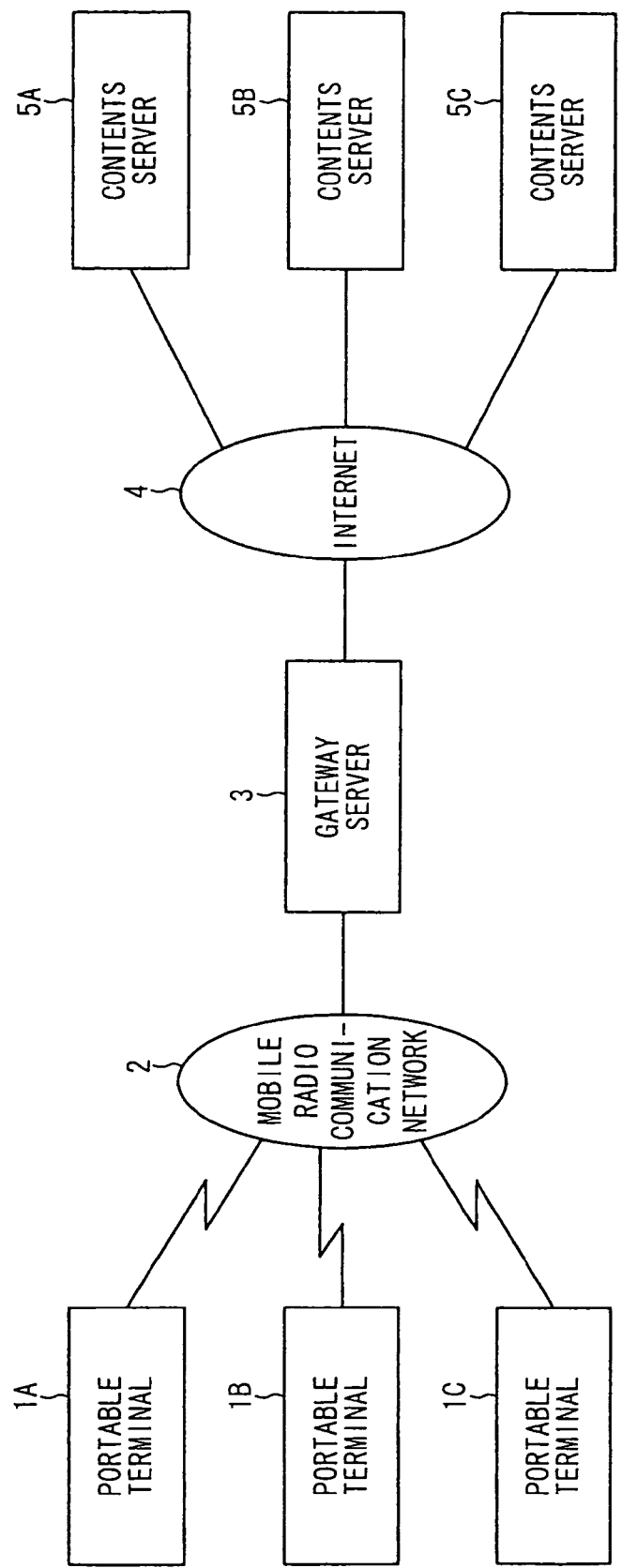
FIG. 1 is a block diagram showing the construction of a preferred embodiment of the invention.

FIG. 1 shows a system according to a preferred embodiment of the invention which comprises: a mobile radio communication network 2 which realizes mobile radio communication; a portable terminal 1 which realizes communication (for example, voice communication or data communication) with desired communication equipment through this mobile radio communication network 2; the Internet 4; a contents server 5 which is present on the Internet 4 and provides contents service within the Internet 4; and a gateway server 3 responsible for a relay of data between the mobile radio communication network 2 and the Internet 4.

The portable terminal 1 accesses a gateway server 3 having the nearest access point through the mobile radio communication network 2, and then accesses a desired contents server 5 present on the Internet 4 through this gateway server 3.

The contents server 5 is located within the Internet 4, and provides contents services for the portable terminal 1.

The gateway server 3 has the function of performing protocol conversion of a radio communication protocol in the mobile radio communication network 2, which the portable terminal 1 utilizes, and a communication protocol in the Internet 4 in which the contents server 5 is present.

Figure 2:
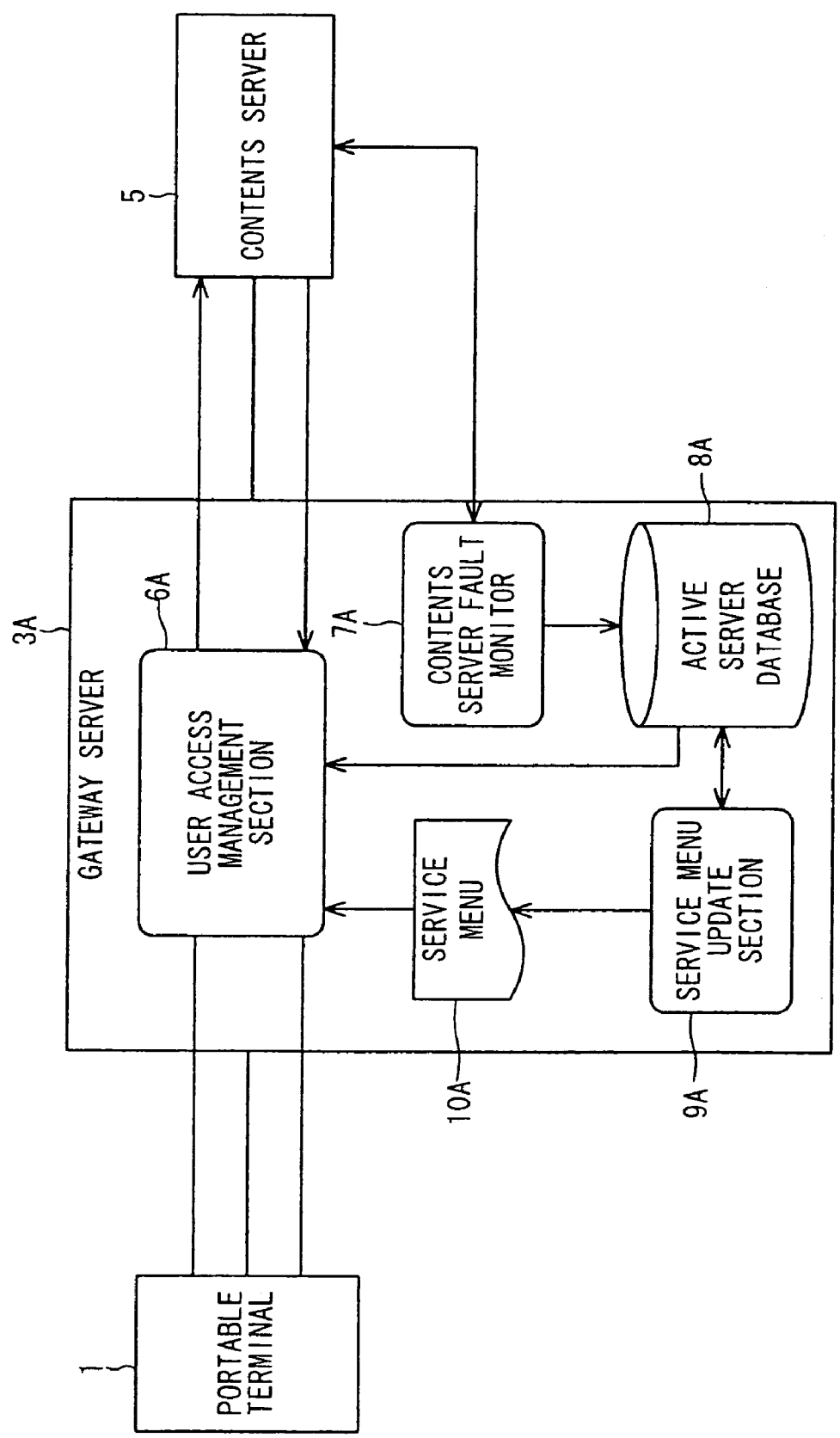
FIG. 2 is a block diagram showing the construction of a first preferred embodiment of the invention.

Further, as shown in FIG. 2, the gateway server 3 comprises a user access management section 6A, a contents server fault monitor 7A, a server operation database 8A, and a service menu update section 9A.

The user access management section 6A is responsible for gateway function of the mobile radio communication network 2 and the Internet 4 different from each other in communication protocol (i.e., protocol conversion of the communication protocol in the mobile radio communication network 2 and the protocol in the network on which the contents server is present).

The contents server fault monitor 7A monitors the operation status of all the contents servers 5, which provide services, server by server.

More specifically, the contents server fault monitor 7A periodically sends an operation confirmation message to all the registered contents servers 5. Based on whether or not there is an operation confirmation response message from the contents servers 5, the contents server fault monitor 7A detects whether the contents server 5 is in such a state that the service can be provided, or in such a state that the service cannot be provided due to some fault. The operation status of the detected contents server 5 is cataloged in the server operation database 8A.

The service menu update section 9A is operated in cooperation with the contents server fault monitor 7A, periodically monitors the contents of the server operation database 8A, and, when there is an inactive contents server 5, prepares a new service menu, for the service provided by the inactive contents server 5, informing that this contents server 5 cannot provide a service due to the occurrence of a fault.

The present preferred embodiment having the above construction is characterized in that, when a service providing contents server 5 cannot provide a service due to the occurrence of fault, fault information is notified to the portable terminal 1 prior to the receipt of a request from the portable terminal 1 for access.

To this end, according to the present preferred embodiment, the contents server fault monitor 7A in the gateway server 3A manages the operation status of previously registered service providing contents servers 5, and the operation status of the contents servers 5 is cataloged in the server operation database 8A.

The contents server fault monitor 7A periodically sends an operation confirmation message to all the registered contents servers 5, and waits for an operation confirmation response message from the contents servers 5. Contents servers 5, from which there is no operation confirmation response message after the elapse of a predetermined time period, are regarded as inactive contents servers and are cataloged in the server operation database 8A.

FIG. 3 shows an embodiment of "service-contents server correspondence management table" held in the server operation database 8A, and FIG. 4 an embodiment of "contents server state management table" which is here again held in the server operation database 8.

The "service-contents server correspondence management table" is a table for managing services provided by the contents severs 5. As shown in FIG. 3, this management table contains service specifying identifiers for identifying services provided by the contents severs 5 and ID numbers of the contents servers which provide the services. In this case, the service specifying identifiers are recorded in association with the ID numbers of the contents servers. In the "service-contents server correspondence management table" shown in FIG. 3, URLs (uniform resource locators) are used as the service specifying identifiers for identifying the services. When a plurality of services are provided by one contents server 5, in some cases, an identical contents server ID is cataloged in separate service specifying identifiers (URLs).

Further, the "contents server state management table" shown in FIG. 4 is a table for managing the operation status of the contents servers. As shown in FIG. 4, this management table manages, in association with one another, contents server ID numbers as the identification numbers of the contents servers, address information for the contents servers (the use of an IP address is shown as an example in FIG. 4), and the operation status of the contents servers. For the contents server 5 which has been judged to be inactive by the contents server fault monitor 7, the column of "operation status" for managing this contents server in the management table is set to "inactive" (a case, where the inactive state is recorded as 0 while the active state is recorded as 1, is shown as an example in FIG. 4).

The service menu update section 9A operated in cooperation with the contents server fault monitor 7A periodically monitors the "contents server state management table" in the server operation database 8A. When a contents server 5, which was newly cataloged as an inactive server, has been detected, the service menu update section 9A prepares a new service menu informing that a service to be provided by the contents server 5 cannot be provided.

Upon the receipt of a request from the portable terminal 1 for access to a service, a service menu with fault information of the contents servers being added thereto is notified to the portable terminal 1.

Figure 5A:
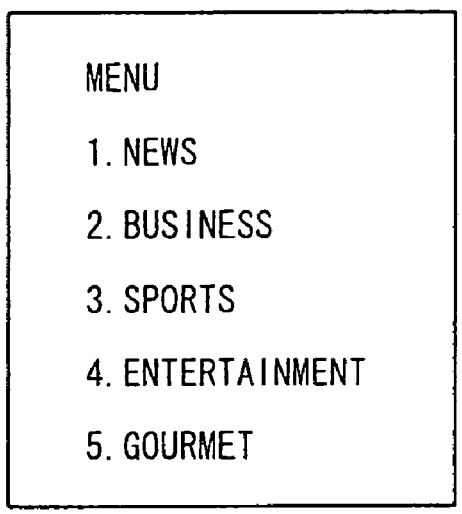
FIG. 5 is a diagram showing the construction of a service menu screen displayed on a portable terminal.
Figure 5B:
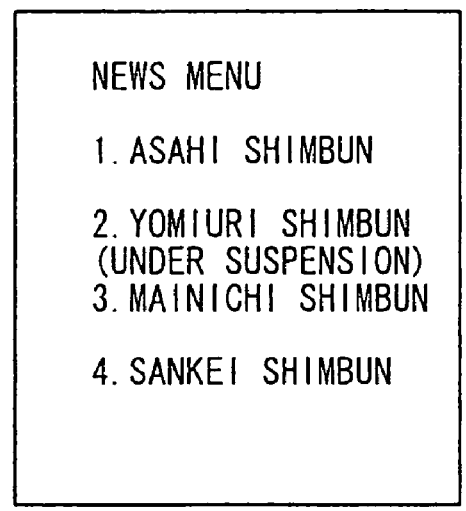

FIG. 5 shows an embodiment of the construction of a service menu sent to the portable terminal 1 from which the request for access has been sent by the operation of a user. The service menu comprises "main menu" shown in FIG. 5A, which displays genres of services provided by the registered contents servers, and "menu divided according to genre" shown in FIG. 5B which is then displayed by selecting one genre among the genres in the "main menu" and summarizes services belonging to the designated genre.

When there is a contents server 5, which is inactive due to fault or the like, as shown in FIG. 5B, in the "menu divided according to genre," information about the suspension of the service is displayed.

Thus, according to this preferred embodiment, upon a request from a portable terminal 1 for access to service, a service menu indicating services provided by only active service providing contents servers can be previously presented to the portable terminal 1 before connection to the network. This can restrict unnecessary access to the inactive contents server 5.

Further, since a service menu, which summarizes all services provided by the active contents servers 5, is provided to the portable terminal 1, it is possible to prevent access of the portable terminal 1 to the inactive contents server 5. Thus, this can eliminate the disadvantage of the techniques disclosed in Japanese Patent Laid-open Nos. 249249/1996 and 214545/1997 such that the operation status of a contents server, for which a request for access has been sent by the portable terminal can be recognized, whereas the operation status of other contents servers 5 cannot be recognized.

Further, since the access to the inactive contents server 5 can be restricted, an unnecessary information exchange between the gateway server 3A and the contents server 5 can be reduced.

Figure 6:
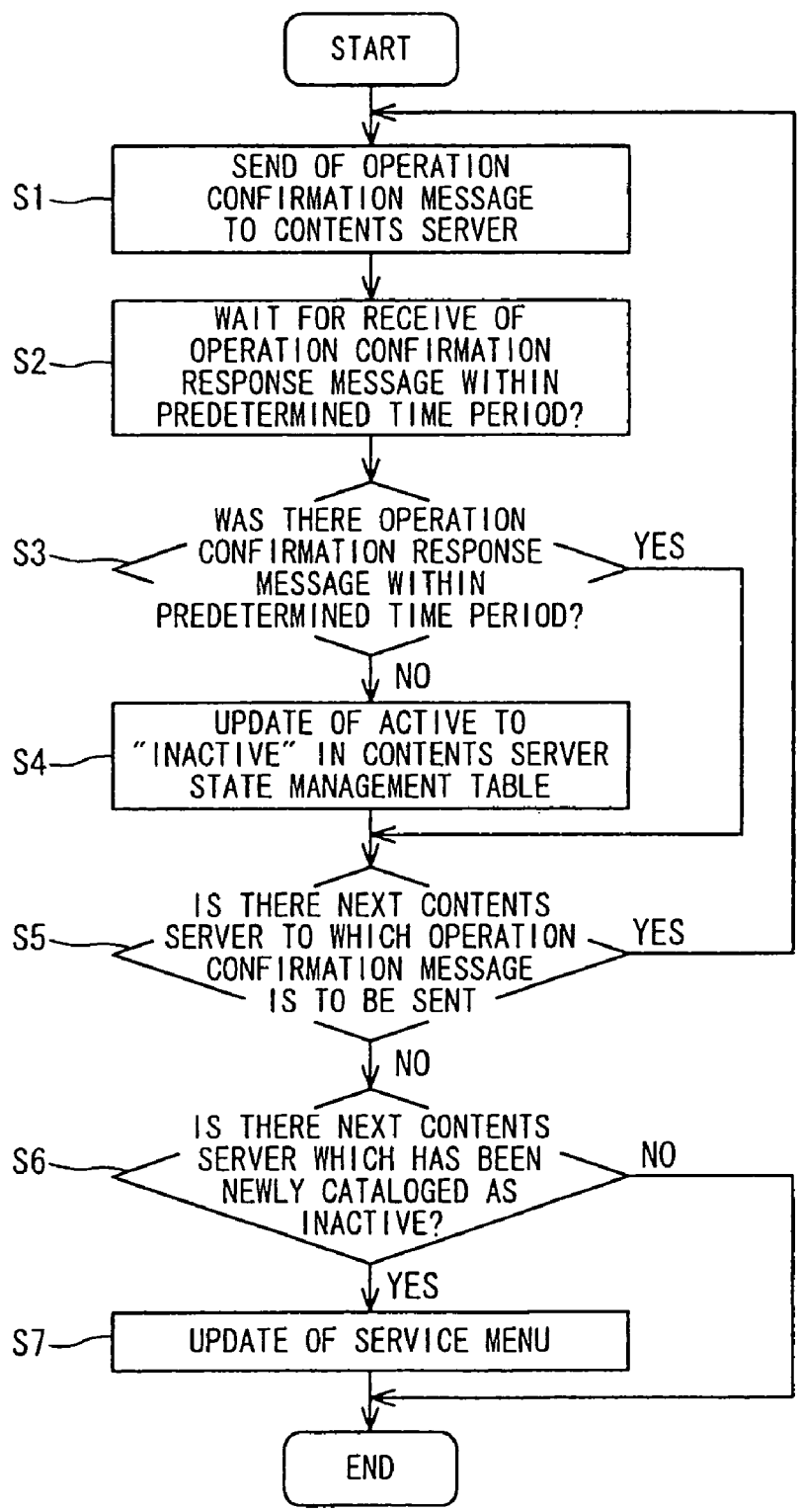
FIG. 6 is a flow chart showing the operation of processing according to the first preferred embodiment shown in FIG. 2.
Figure 7:
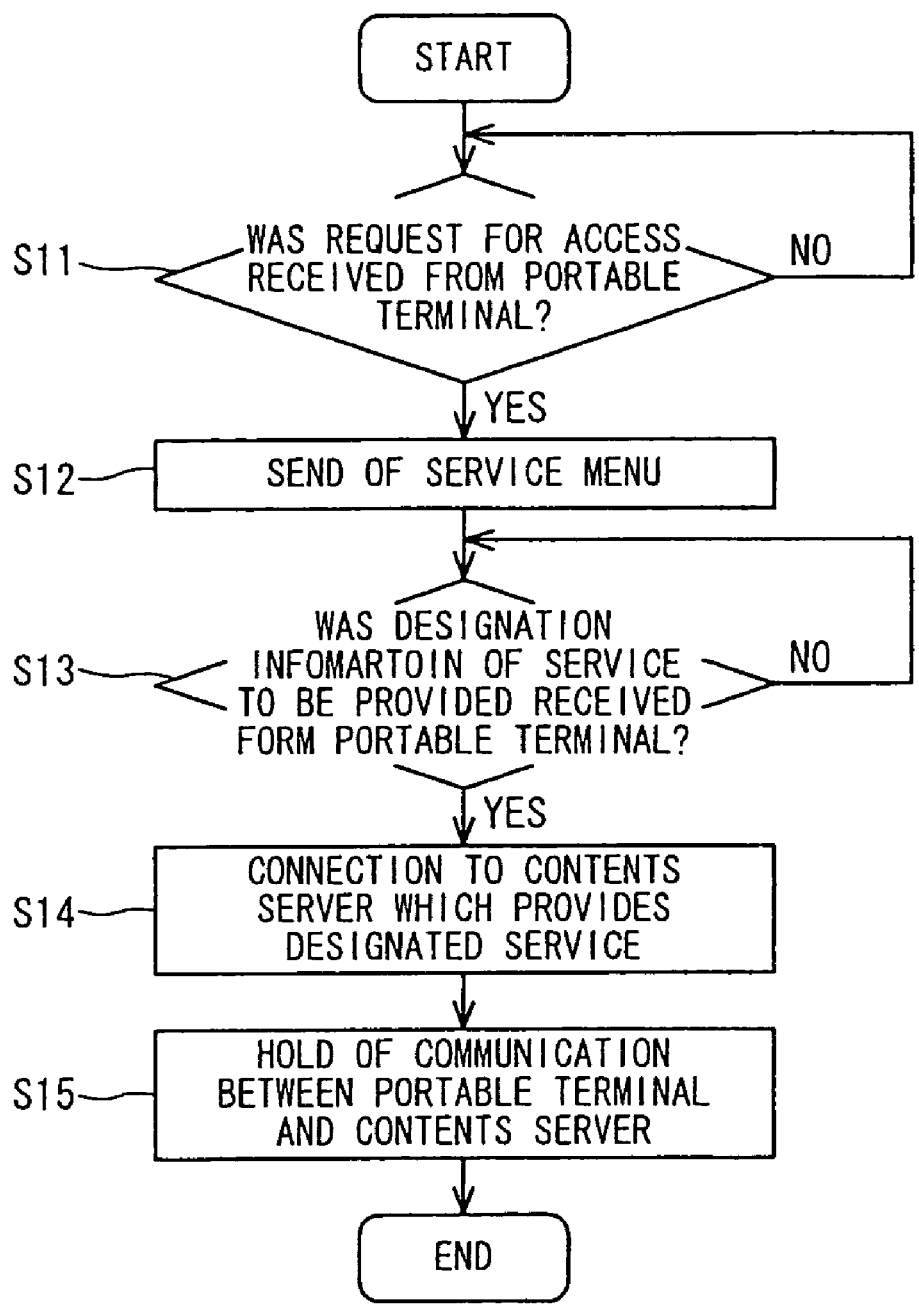
FIG. 7 is a flow chart showing the operation of processing according to the first preferred embodiment shown in FIG. 2.

Next, a series of operations of the above-described preferred embodiments will be explained in conjunction with flow charts shown in FIGS. 6 and 7.

At the outset, the flow of processing for managing the active and inactive states of the contents servers 5 by the gateway server 3A will be explained in conjunction with FIG. 6.

The contents server fault monitor 7A in the gateway server 3A sends an operation confirmation message each predetermined time to previously registered contents servers 5 (step S1). In this case, since the gateway server 3A manages the active/inactive state of each contents server 5, the operation confirmation message is sent for each address (for example, an IP address) of the contents servers. The gateway server 3A then waits for an operation confirmation response message from each of the contents servers 5 (step S2).

When the operation confirmation response message cannot be received from a contents server 5, to which the operation confirmation message has been sent, even after the elapse of a predetermined time from the sent of the operation confirmation message (step S3/NO), this contents server is cataloged as an inactive contents server in the "contents server state management table" (step S4). On the other hand, when an operation confirmation response message is received within the predetermined time (step S3/YES), the contents server is judged to be active.

The above processing is carried out each predetermined time for all the contents servers 5 which have been previously registered in the gateway server 3A (step S5).

Upon the completion of the detection of the active/inactive state of all the contents servers 5 and the cataloging of the state in the server operation database 8A (step S5/YES), the service menu update section 9A operated in cooperation with the contents server fault monitor 7A monitors the "contents server state management table" which manages the operation status of the contents servers 5 (step S6). Upon the detection of a contents server 5 which has been newly cataloged as an inactive contents server (step S6/YES), the service menu update section 9A prepares a new service menu in which an indication of "service under suspension" has been provided to all the services supplied by this contents server 5 (step S7). On the other hand, when any contents server 5, which was newly set as an inactive contents server, could not have been detected (step S6/NO), update of the service menu is not carried out.

Next, the flow of processing of the gateway server 3A, in the case where there was a request from the portable terminal 1 for access, will be explained in conjunction with the flow chart shown in FIG. 7.

Upon the receipt of a request from the portable terminal 1 for access (step S11/YES), the gateway server 3A sends the service menu prepared by the service menu update section 9 to the portable terminal 1 which has requested the access (step S12).

For example, a screen displaying "main menu" shown in FIG. 5A is first displayed on the display screen of the portable terminal 1.

The user of the portable terminal 1 refers to the "main menu screen" displayed on this screen, and then operates an operation section to select a desired genre, whereby a screen displaying "menu divided according to genre" shown in FIG. 5B is then displayed. The user of the portable terminal 1 refers to the screen of menu divided according to genre, and then operates the operation section to select a desired service. Upon this operation, information about the selected service is sent to the gateway server 3A.

Upon the selection of the service by the portable terminal 1, the gateway server 3A performs connection to the contents server 5 which provides the selected service. Thus, communication between the portable terminal 1 and the contents server 5 is established.

The above processing permits a service menu recording the active/inactive state of contents servers 5, which provide services to the portable terminal 1, to be sent to the portable terminal 1 before the connection of the portable terminal 1 to the network. This can prevent access of the portable terminal 1 to an inactive contents server 5.

Next, a second preferred embodiment of the invention will be explained in conjunction with the accompanying drawings.

In the above-described first preferred embodiment, whether or not the service can be provided is managed by detecting the operation status of the contents servers. Therefore, in this case, the contents server is recognized as inactive only in the case where the contents server is down due to fault or the like, the case where a line connected to the contents server is in a broken state, and the case where a large number of accesses are concentrated to render the line busy making it impossible to access.

For this reason, even though the contents server has been judged to be active by the gateway server, when the contents server provides a plurality of services, in some cases, one or two or more of the services is under suspension, for example, due to rewrite of data. Any service cannot be provided by access to the service under suspension.

Figure 8:
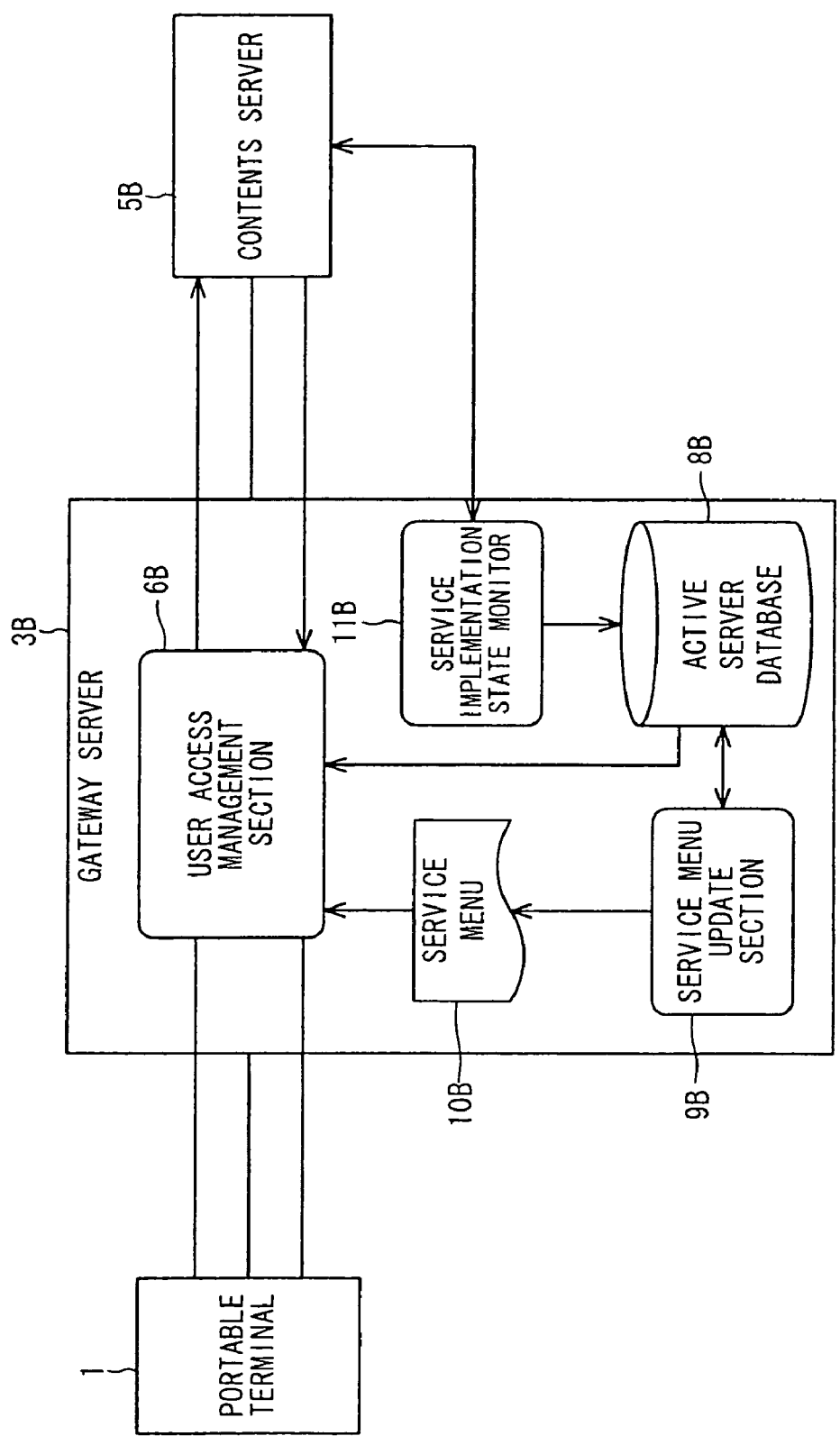
FIG. 8 is a block diagram showing the construction of a second preferred embodiment according to the invention.

In order to prevent this trouble, according to the second preferred embodiment of the invention, a service implementation status monitor 11B shown in FIG. 8 manages, service by service, the state of services provided by the contents server 5.

More specifically, the service implementation status monitor 11B in the gateway server 3B manages service by service, provided by the contents server 5, whether or not the service can be provided and whether or not the service can be acquired.

The service implementation status monitor 11B sends an implementation confirmation message, for each service specifying identifier (URL in this preferred embodiment), to access service.

Figure 9:
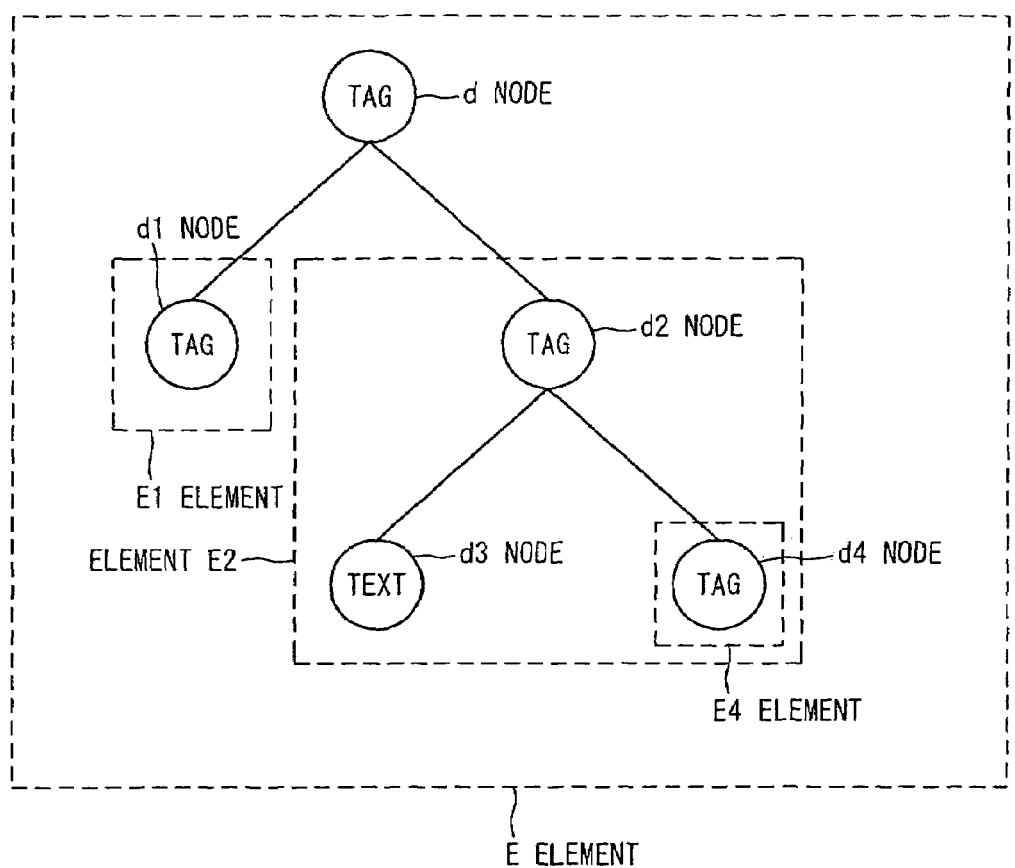
FIG. 9 is a diagram showing the structure of a structured document held in a contents server.

Data held in the contents server are structured documents, such as HTML (hypertext markup language), SGML (standard generalized markup language), XML (extensible markup language), and WML (wireless markup language). As shown in FIG. 9, in the structured document, elements as a unit of the document part are hierarchically constructed. The elements are represented by tags for identifying the respective elements.

When the service provided by the contents server is under suspension, for example, due to revision of data, data of "service under suspension" is disposed by the provider of the service on a predetermined page (for example, an index page). Upon the detection of this data, the service implementation status monitor 11B judges this service as one under suspension. Further, when the hierarchy, which can access to service provided by the contents server 5, does not reach a predetermined hierarchy, the service may be judged to be under suspension.

In the management of the service acquisitive state, management is carried out on whether or not the line connected to the contents server, which provides the service, is down, and whether or not the line is busy due to a large number of requests for access to the service.

In this management, the service implementation status monitor 11B sends an implementation confirmation message for each service specifying identifier (URL in this preferred embodiment), and, when any response could not be obtained from the contents server after the counting of a predetermined time, this service is judged not to be an acquisitive state.

The service implementation status monitor 11B catalogs services, which were judged to be under suspension or not to be acquisitive by the above-described judgment method, as "service under suspension" in the server operation database 8B.

The present preferred embodiment (second preferred embodiment) is different from the first preferred embodiment in the construction of the management table managed by the server operation database 8B. As shown in FIG. 10, the "service state management table," which manages, service by service, the state of services provided by the contents servers, is held in the server operation database 8B according to this preferred embodiment. As shown in FIG. 10, this management table manages, in association with one another, service specifying identifiers (URL in this preferred embodiment) for specifying services, address information (IP address in this preferred embodiment) of the contents server 5 which provides the services, and the status of implementation of each service identified by the service specifying identifier.

The adoption of the management table having this construction can realize management such that a plurality of services provided by the contents server 5 are managed, service by service, on whether the service is in a providable state or under suspension.

Figure 11:
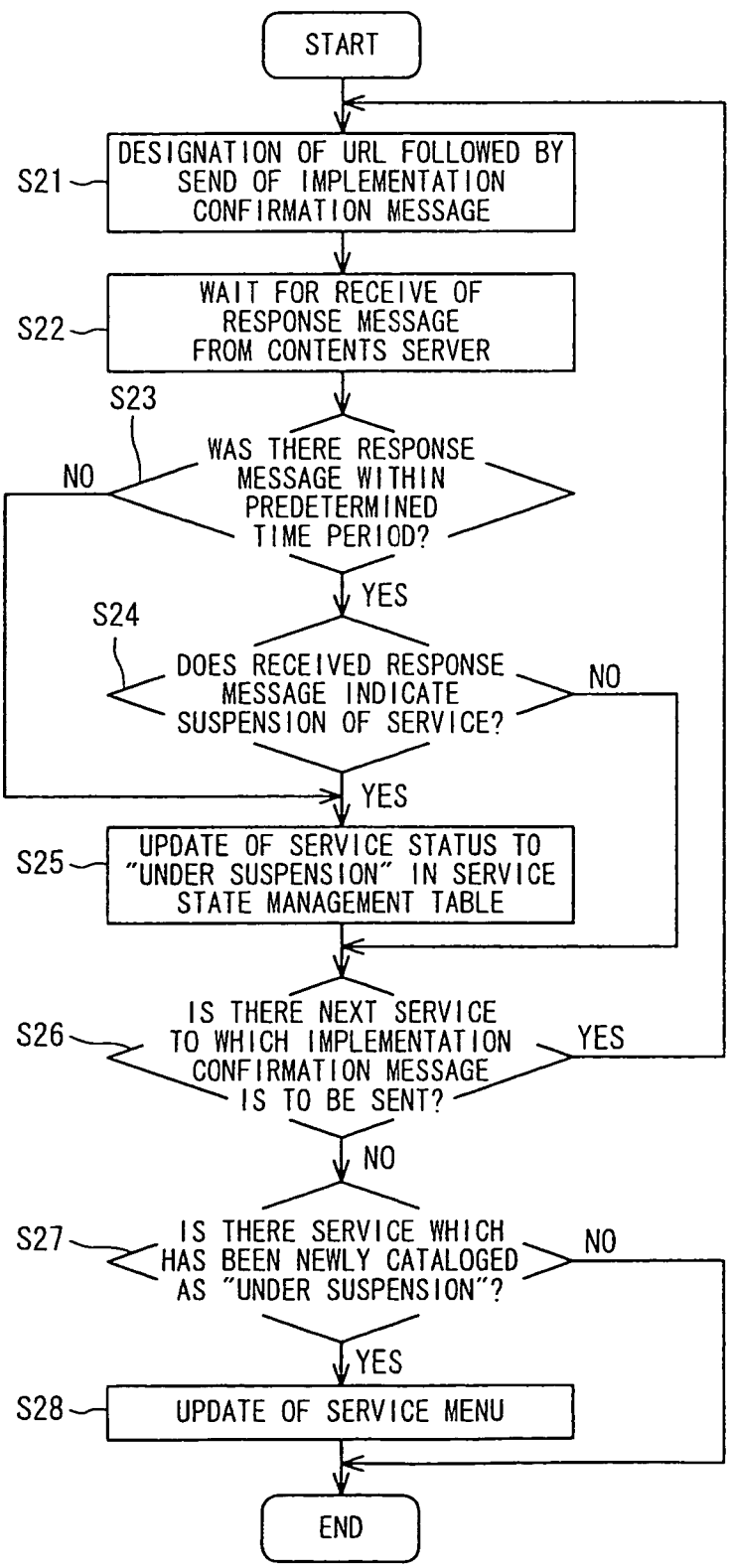
FIG. 11 is a flow chart showing the operation of processing according to the second preferred embodiment shown in FIG. 8.

Next, the operation of service menu update processing according to this preferred embodiment will be explained in conjunction with the flow chart shown in FIG. 11.

The service implementation status monitor 11B in the gateway server 3B designates URL and sends an implementation confirmation message to the contents server 5 (step S21).

The service implementation status monitor 11B then waits for a response message from the contents-containing contents server 5 (step S22).

When any response message is not received from the contents-containing contents server 5, to which the implementation confirmation message has been sent, after the elapse of a predetermined time from the sent of the implementation confirmation message (step S23/NO), the service implementation status monitor 11B judges that the service provided by the contents server cannot be acquired, for example, due to interminglement of the line, followed by update of the service status in the "service state management table" to "under suspension" (step S25).

On the other hand, when there is a response message from the contents server 5 within a predetermined time (step S23/YES), a judgment is made on whether or not the received response message indicates the suspension of the service (step S24).

When the response message sent from the contents server is a message of "service under suspension" (step S24/YES), the contents are cataloged as the service under suspension in the "service state management table" (step S25). On the other hand, when the received response message is a message indicating the implementation of the service (step S24/NO), a judgment is then made on whether or not there is a service to which an implementation confirmation response message should be next sent (step S26).

The above processing is carried out each predetermined time for all registered services (step S26).

Upon the completion of the detection of the implementation state of all the services and the cataloging of the state in the server operation database 8B (step S26/NO), the service menu update section 9B operated in cooperation with the service implementation status monitor 11B monitors the "service state management table" which manages the operation status of the contents servers 5 (step S27). Upon the detection of a service which has been newly cataloged as being under suspension (step S27/YES), the service menu update section 9B prepares a new service menu in which an indication of "service under suspension" has been provided to the service (step S28). On the other hand, when any service, which was newly set as a service under suspension, could not have been detected (step S27/NO), update of the service menu is not carried out.

The request, from the portable terminal 1 which has utilized the service menu provided by the gateway server 3, for access to the contents server 5 is the same as described above in connection with the operation of the first preferred embodiment, and, thus, the explanation thereof will be omitted.

The above processing permits a service menu recording the implementation status of services provided by the contents server 5 to be sent to the portable terminal 1 before the connection of the portable terminal 1 to the network. This can prevent access of the portable terminal 1 to the service under suspension, and thus can shorten the time necessary for access to a contents server 5 which provides a desired service.

Next, a third preferred embodiment of the invention will be explained in conjunction with the accompanying drawings.

According to the third preferred embodiment of the invention, the service menu prepared by the gateway server 3 explained by the above preferred embodiment is push-distributed to a portable terminal 1.

Figures 12, 13:
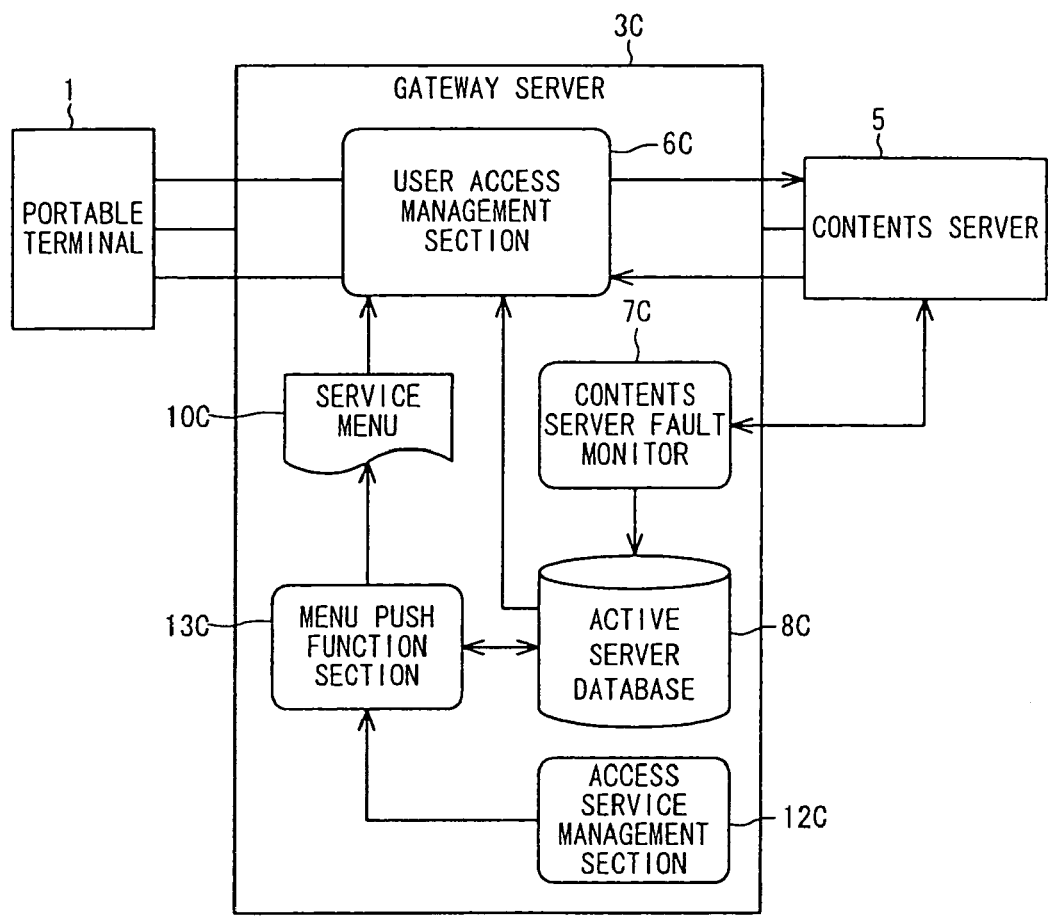
FIG. 12 is a block diagram showing the construction of a third preferred embodiment of the invention.
FIG. 13 is a diagram showing the construction of a push cycle management table held in an access service management section.

To this end, in this preferred embodiment, as shown in FIG. 12, an access service management section 12C and a menu push function section 13C are provided in addition to the user access management section 6C and the server operation database 8C described above.

As shown in FIG. 13, the access service management section 12C has a "push cycle management table" which manages the time of push distribution of the service menu to portable terminals 1, and counts the cycle of push distribution of the service menu to portable terminals 1. Upon the detection of a portable terminal 1 which is in the timing of distribution of the service menu, information about the portable terminal 1 (such as phone number or ID number) is notified to the menu push function section 13C.

The menu push function section 13C refers to the server operation database 8C to prepare a service menu for the portable terminal 1 notified by the access service management section 12C and push-distributes the prepared service menu to the designated portable terminal 1 through the user access management section 6C.

The user of the portable terminal 1 can refer to the service menu screen notified by the gateway server 3C and access to only the services of active contents servers 5. This can prevent the access of the portable terminal 1 to inactive contents servers 5.

Figure 14:
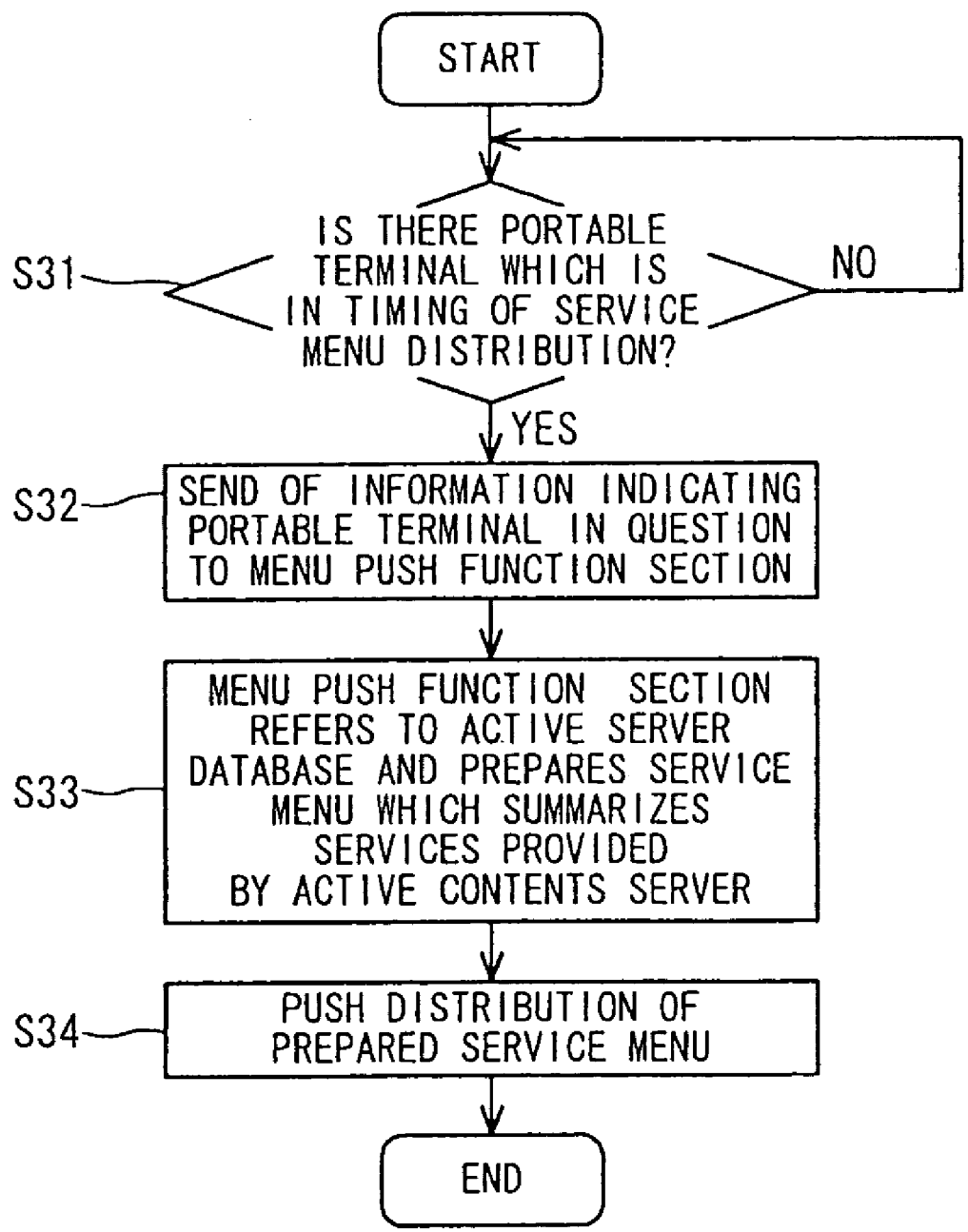
FIG. 14 is a flow chart showing the operation of processing of the third preferred embodiment shown in FIG. 11.

Next, the operation of a series of processings by the gateway server will be explained in conjunction with the flow chart shown in FIG. 14.

The access service management section 12C counts the service menu distribution time of each of the registered portable terminals 1. When a portable terminal 1, which is in predetermined distribution timing, has been detected (step S31/YES), the access service management section 12C notifies the menu push function section 13C of information for identifying the portable terminal (step S32).

The menu push function section 13C refers to the server operation database 8C and prepares a service menu which summarizes services provided by active contents servers 5 (step S33).

The menu push function section 13C push-distributes, through the user access management section 6C, the prepared service menu to the portable terminal 1 designated by the access service management section 12C.

The user of the portable terminal 1 can refer to the service menu distributed by the gateway server 3C and can then send an access request to the gateway server 3C. This can prevent the access of the portable terminal 1 to inactive contents servers 5.

Figure 15:
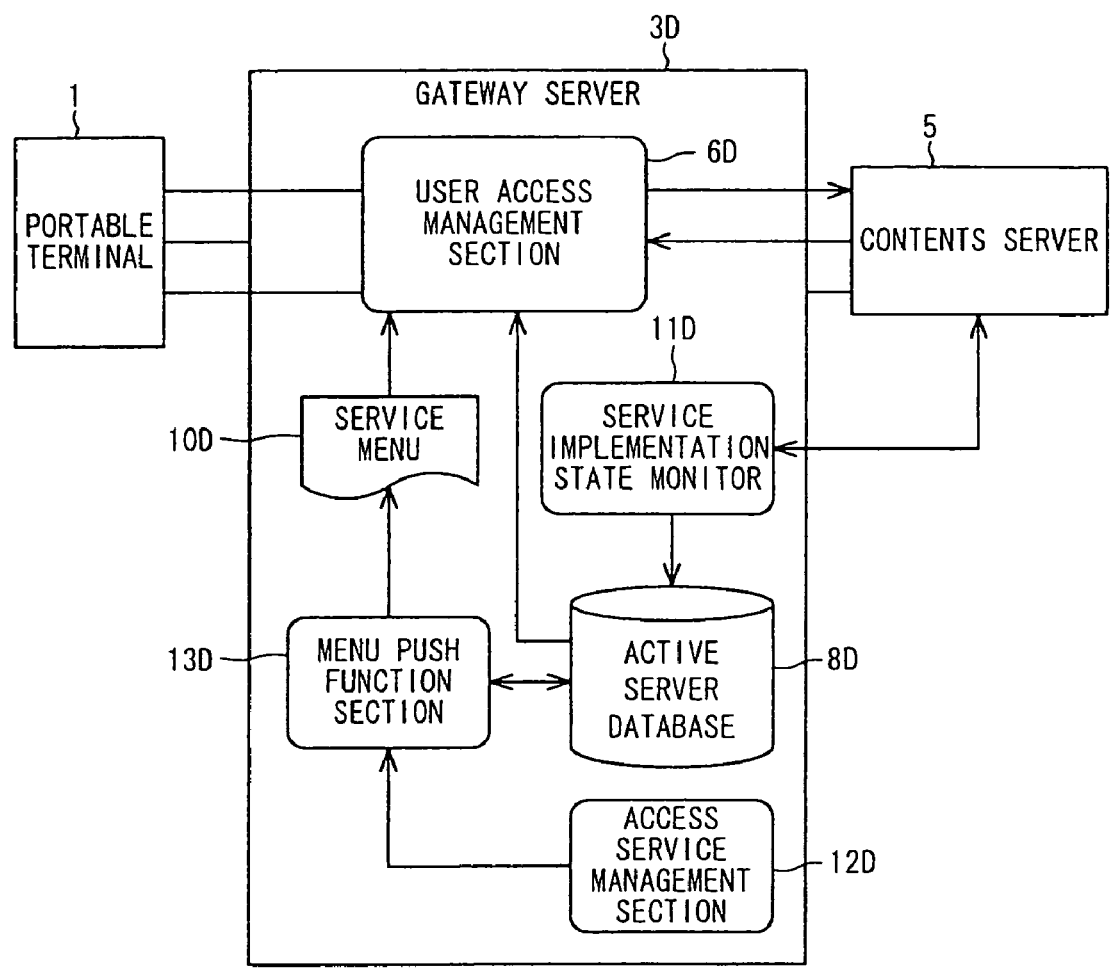
FIG. 15 is a block diagram showing the construction of a variant of the third preferred embodiment.

In the third preferred embodiment, as with the first preferred embodiment, a contents server fault monitor 7C is provided to manage, contents server by contents server, the active/inactive state of contents servers. Alternatively, as shown in FIG. 15, instead of the contents server fault monitor 7C, a service implementation status monitor 11D may be provided to manage, service by service, the implementation status of services provided by the contents server, and the implementation status of services may be held, service by service, in the "service state management table" shown in FIG. 10 provided in the server operation database 8D.

Next, a fourth preferred embodiment of the invention will be explained in conjunction with the accompanying drawings.

According to the fourth preferred embodiment of the invention, an individual menu addition service, wherein the implementation status of services desired by users is provided by push distribution to only previously registered users. In this preferred embodiment, a part of the construction is the same as the construction of the first preferred embodiment, and for other users not registered in the individual menu addition service, only when a request for access has been made by the user, an ordinary service menu is distributed as described above in connection with the first preferred embodiment.

Figure 16:
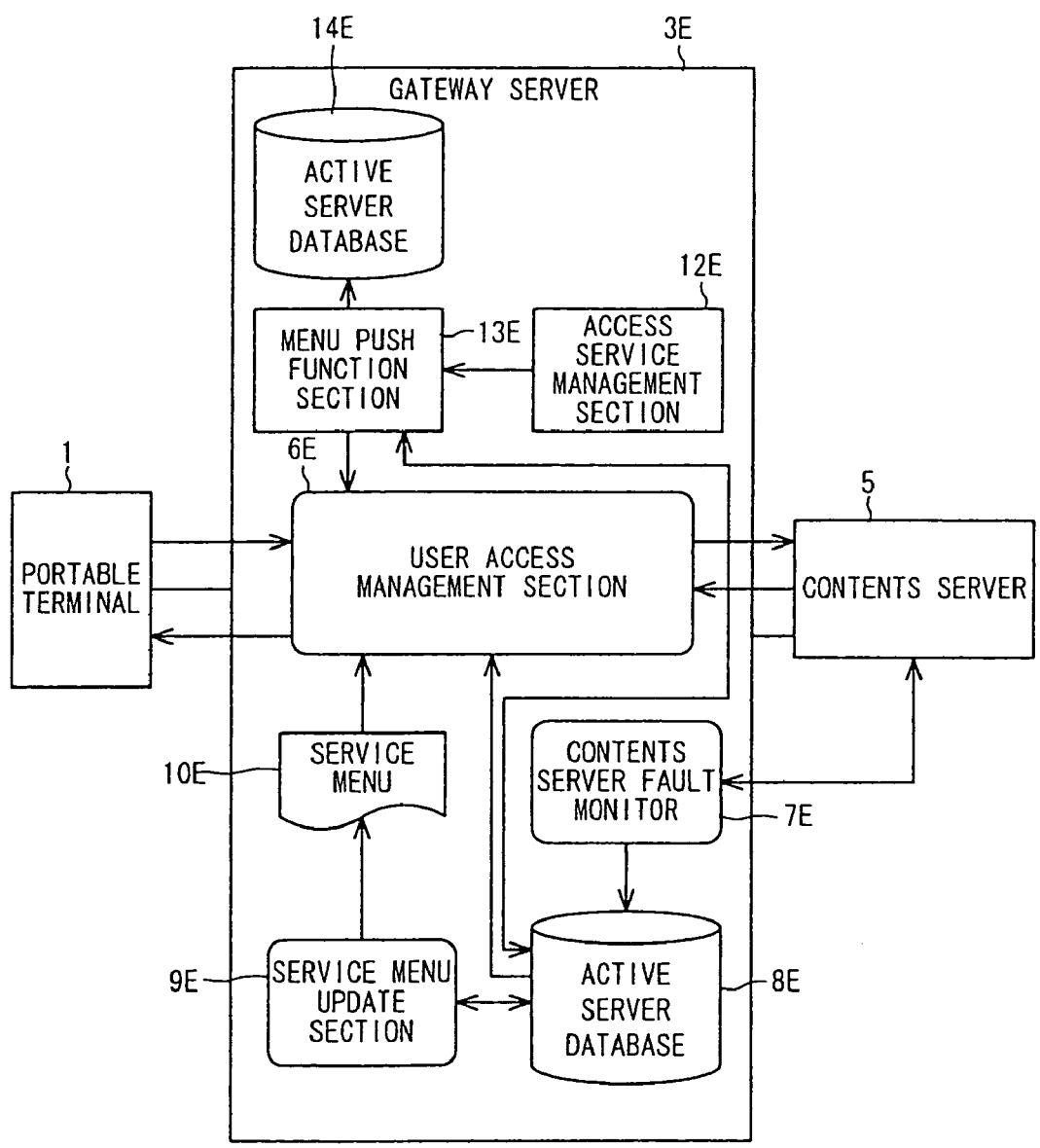
FIG. 16 is a block diagram showing the construction of a fourth preferred embodiment according to the invention.

According to the fourth preferred embodiment of the invention, as shown in FIG. 16, an access service management section 12E, a menu push function section 14E, and a user management database 14E are provided in addition to the elements constituting the first preferred embodiment, that is, the user access management section 6E, the contents server fault monitor 7E, the server operation database 8E, and the service menu update section 9E. The explanation of the same device as used in the first preferred embodiment will be omitted.

The access service management section 12E has an "individual menu addition service management table" shown in FIG. 17, counts the timing of push distribution of the individual menu to users registered in the individual menu addition service, and notifies the menu push function section 13E of information about a portable terminal 1 which is in the timing of service menu distribution.

The "individual menu addition service management table" possessed by the access service management section 12E is a management table which identifies users registered in the individual menu addition service and manages the timing of push distribution of the individual menu to the portable terminal 1 of the registered user. As shown in FIG. 17, in this individual menu addition service management table, a terminal ID for identifying the portable terminal 1, the push cycle describing the timing of push distribution of the individual menu, and the individual menu addition service for identifying whether or not the portable terminal 1 is registered in the individual menu addition service are managed in association with one another.

In the user management database 14E, a "terminal registration service management table" shown in FIG. 18 is provided to manage services which users previously registered in the individual menu addition service desire push distribution of the service menu.

As shown in FIG. 18, in the "terminal registration service management table," the terminal ID (ID number of portable terminal in this preferred embodiment) for identifying the user registered in the individual menu addition service and the service specifying identifier for identifying the service selected by the user are managed in association with each other.

The menu push function section 13E refers to the user management database 14E, and detects services for which the user of the portable terminal 1 notified by the access service management section 12E wishes to learn the implementation status. Further, the menu push function section 13E refers to the server operation database 8E to detect the implementation status of the service detected by the user management database 14E, prepares a service menu, which summarizes the implementation status of the detected services, and then push-distributes the prepared service menu through the user access management section 6E to the designated portable terminal 1.

Figure 19:
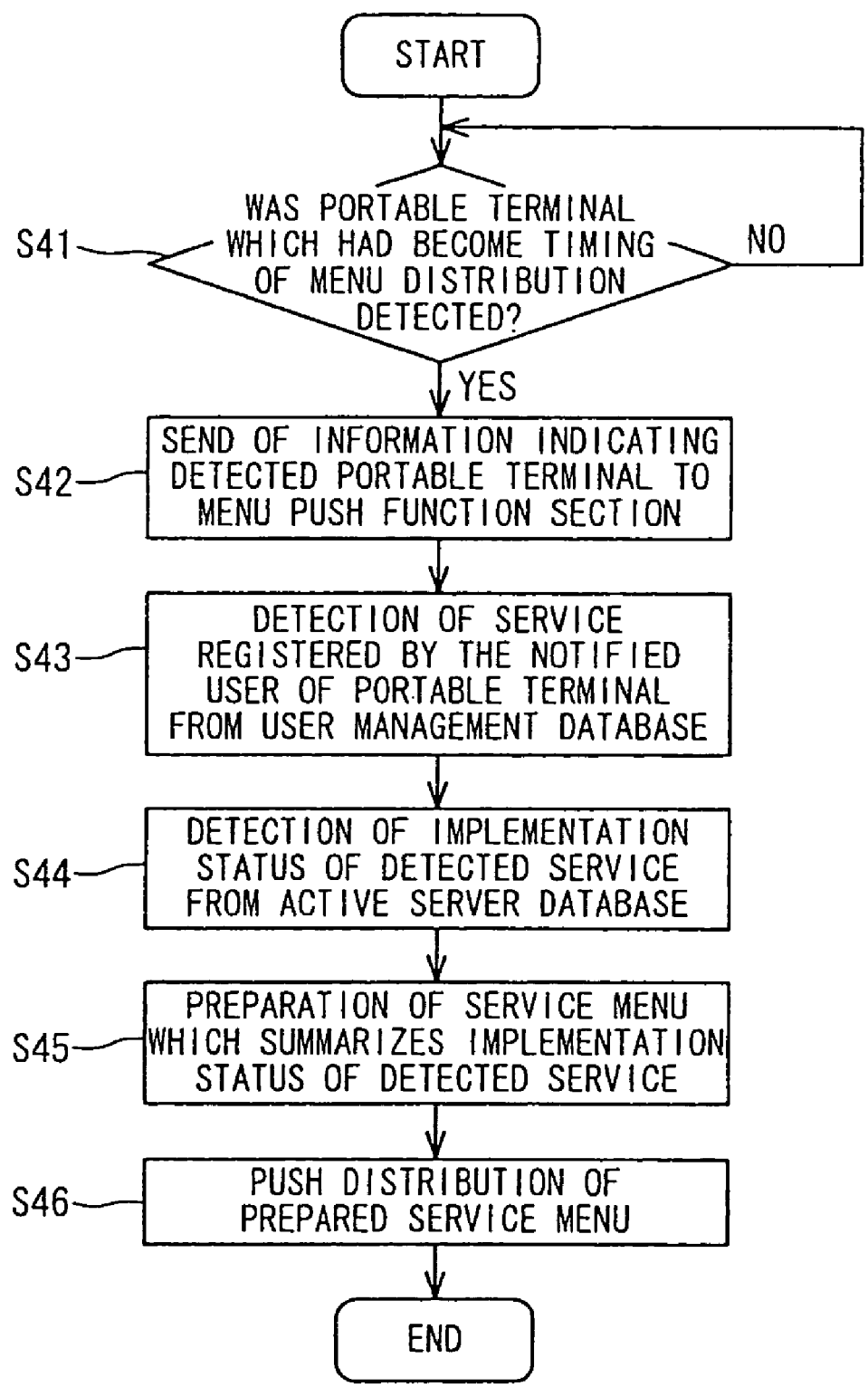
FIG. 19 is a flow chart showing the operation of processing according to the fourth preferred embodiment shown in FIG. 15.

Next, the operation of processing of service for push-distributing a service menu, realized by the present preferred embodiment having the above constitution, will be explained with reference to the flow chart shown in FIG. 19.

The access service management section 12E counts the distribution time of the individual menu, and, when a portable terminal 1, which is registered in the management table and is in timing of menu distribution, has been detected (step S41/YES), notifies the menu push function section 13E of information (phone number in this preferred embodiment) about the detected portable terminal 1 (step S42).

Upon the receipt of the notification from the access service management section 12E, the menu push function section 13E refers to the user management database 14E and detects services in which the user of the designated portable terminal 1 is registered (step S43).

Further, the menu push function section 13E searches the server operation database 8E for the detection of the implementation status of the services obtained from the user management database 14E (step S44), and then prepares a service menu which summarizes the implementation status of the detected services (step S45).

The prepared service menu is push-distributed to the designated portable terminal 1 through the user access management section 6E (step S46).

In fetching information from the network, the user of the portable terminal 1 refers to the previously push-distributed service menu, which summarizes the implementation status of the desired services, and access to the network. This can prevent the access of the portable terminal 1 to the service under suspension, and wasteful communication charge can be reduced.

According to the preferred embodiment, upon the receipt of a request for access from a user not registered in the individual menu addition service, the same operation as in the first preferred embodiment is performed. The explanation of this operation will be omitted.

Figure 20:
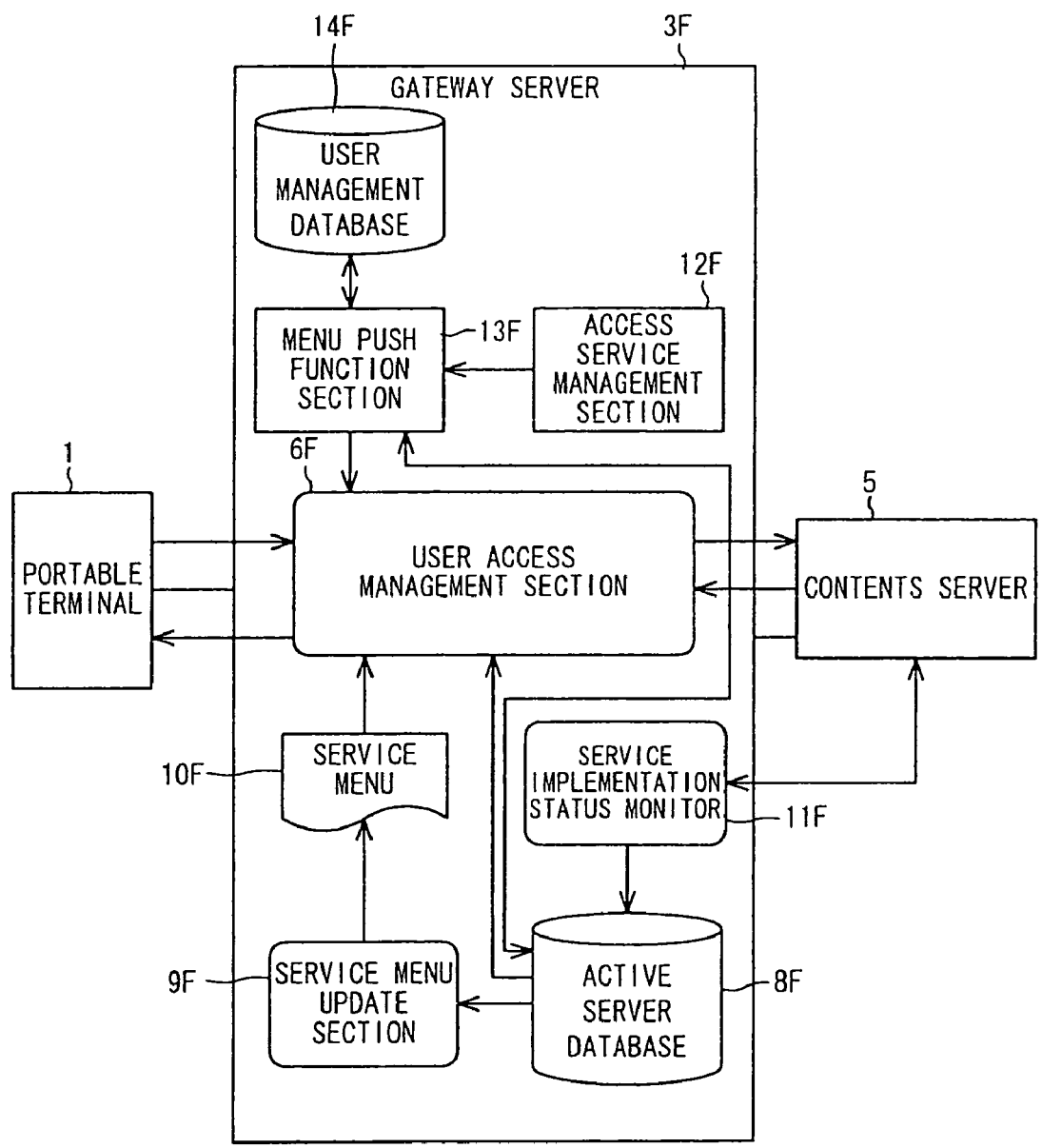
FIG. 20 is a block diagram showing the construction of a variant of the fourth preferred embodiment.

In the fourth preferred embodiment, as with the first preferred embodiment, a contents server fault monitor 7E is provided to manage, contents server by contents server, the active/inactive state of contents servers. Alternatively, as shown in FIG. 20, instead of the contents server fault monitor 7E, a service implementation status monitor 11F may be provided to manage, service by service, the implementation status of services provided by the contents server, and the implementation status of services may be held, service by service, in the "service state management table" shown in FIG. 10 provided in the server operation database 8F.

Figure 21:
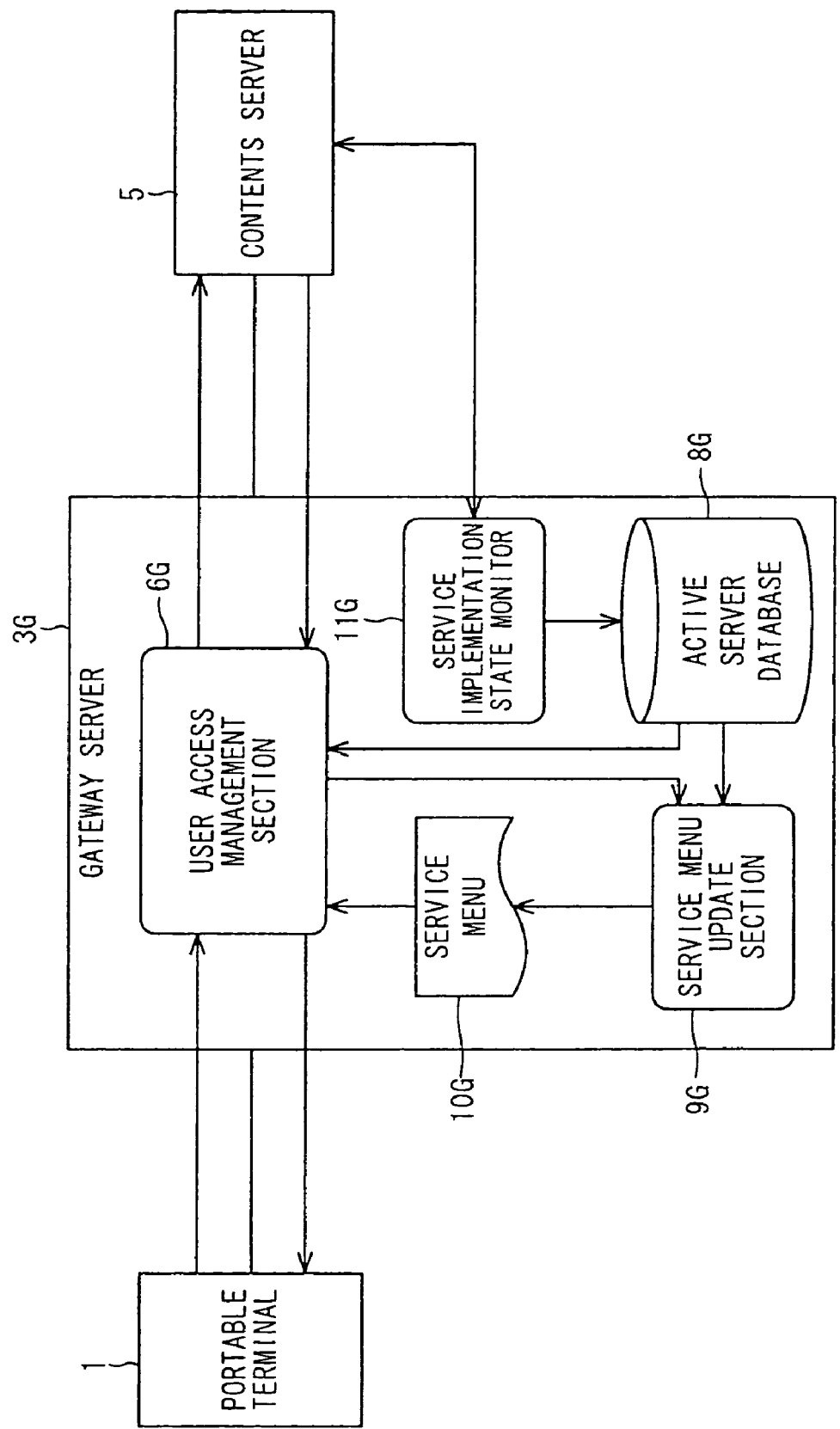
FIG. 21 is a block diagram showing the construction of a fifth preferred embodiment of the invention.

Next, a fifth preferred embodiment of the invention will be explained in detail in conjunction with the accompanying drawings. As shown in FIG. 21, the construction of the fifth preferred embodiment is the same as that of the second preferred embodiment, except that the user access management section 6G is connected to the service menu update section 9G.

In the above preferred embodiments, unnecessary access to the network is prevented by a method wherein, upon a request for access from a portable terminal, the gateway server 3 previously transfers, to the portable terminal, prior to connection to the network, a service menu which summarizes the active/inactive state of contents servers or summarizes, service by service, the providable/suspended state of services provided by contents servers.

On the other hand, according to the present preferred embodiment, the user of the portable terminal 1 directly designates a target service and accesses the target service without the receive of the provision of a service menu from the gateway server 3.

In the technique disclosed in Japanese Patent Laid-Open No. 249249/1996 (prior art 1) and the technique disclosed in Japanese Patent Laid-Open No. 214545/1997 (prior art 2), the active/inactive state is managed contents server by contents server. Therefore, for example, upon a request for access to a service provided by a contents server, other service provided by this contents server is also judged not to be in a providable state, and, consequently, the access to the other service provided by the contents server is unfavorably restricted.

Further, since the active/inactive state is managed contents server by contents server, for example, it is possible to notify that the service, to which the user has requested the access, is not in a providable state. However, the user cannot learn the status of services provided by other contents servers. Therefore, there is a possibility that the service, to which the user has next requested the access, also is not in a providable state.

On the other hand, according to the present preferred embodiment, the providable/suspended state of services provided by contents servers 5 is managed service by service by the service implementation status monitor 11G and the service state management table provided in the server operation database 8G. When the portable terminal 1 has designated a target service and directly accessed the target service without the receive of the service menu from the gateway server 3, the user access management section 6 searches the server operation database 8G for the detection of the providable/suspended state of the designated service. When the designated service is under suspension, the user access management section 6 notifies the service menu update section 10G of the suspended state of the detected service, prepares a service menu belonging to the same genre as the designated service, and sends the prepared service menu to the portable terminal which has requested the access.

Therefore, when the service, to which the access has been requested by the portable terminal, is not presently in a providable state, a service menu, providable at that time, belonging to the same genre as the service can be notified to the user of the portable terminal. Thus, the user of the portable terminal can prevent a trouble such that services, to which the access has been successively requested by the user, are not in a providable state.

Figure 22:
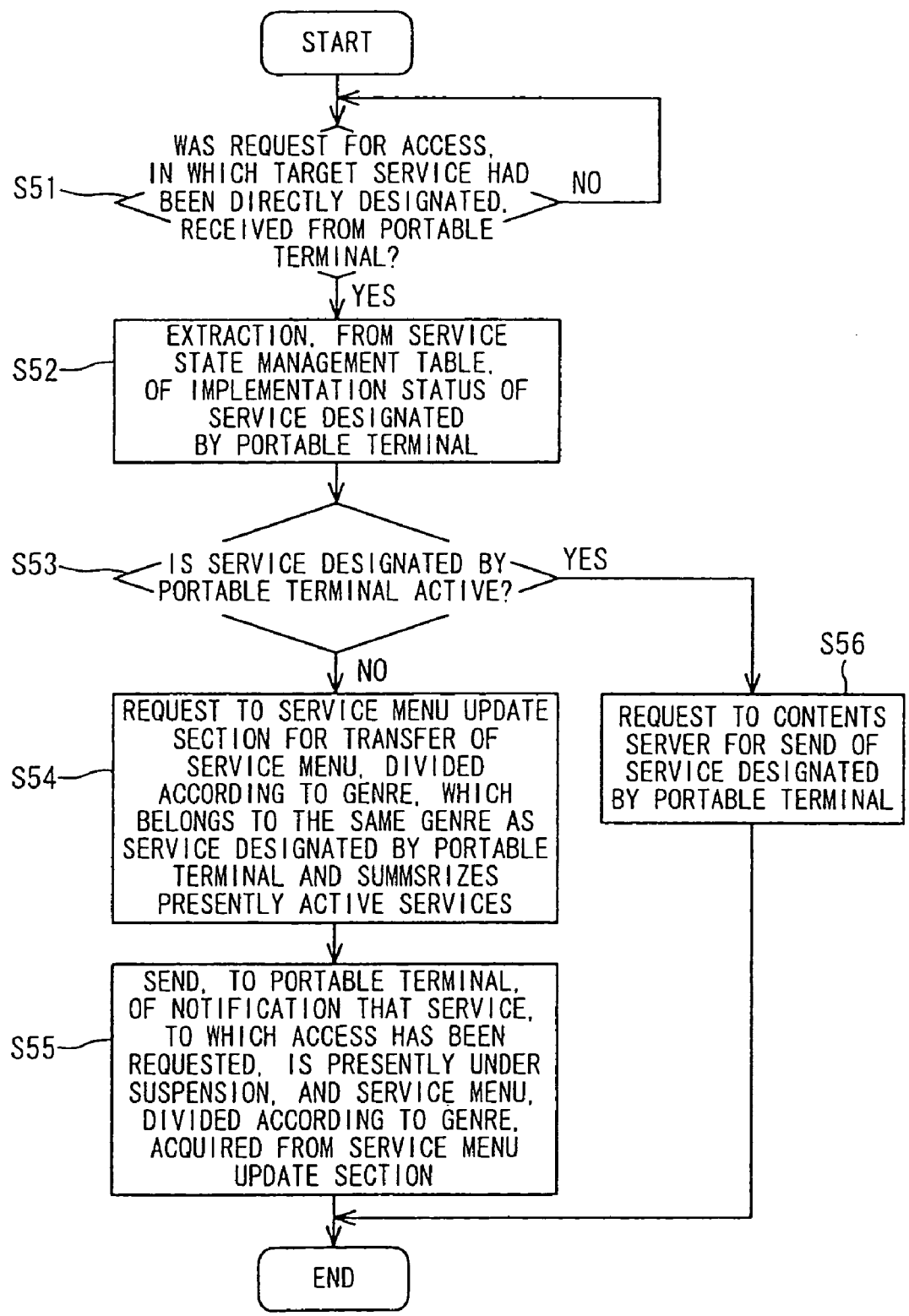
FIG. 22 is a flow chart showing the operation of processing of the fifth preferred embodiment shown in FIG. 20.
Figure 23:
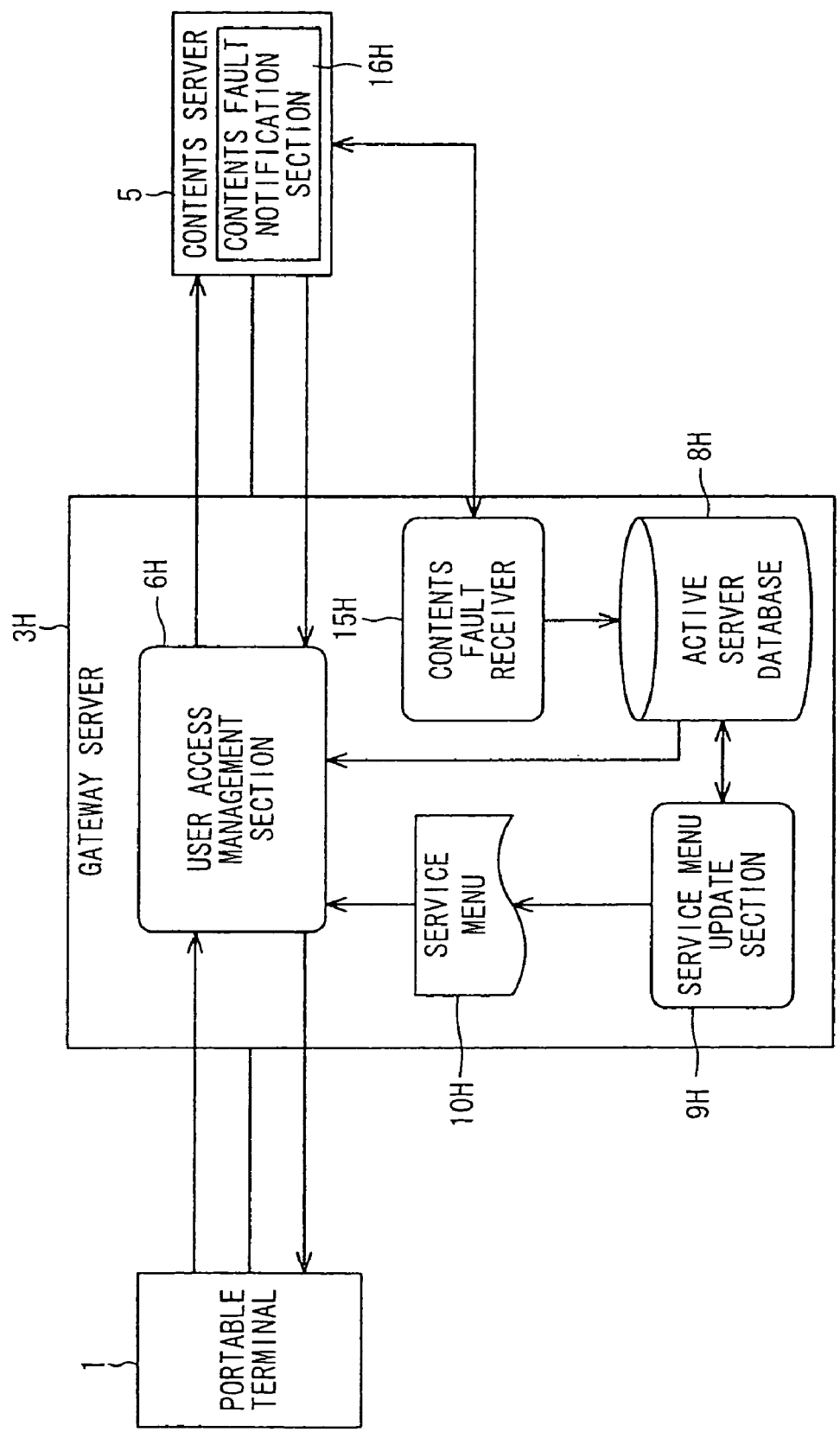
FIG. 23 is a block diagram showing the construction of a variant according to the second preferred embodiment of the invention.
Figure 24:
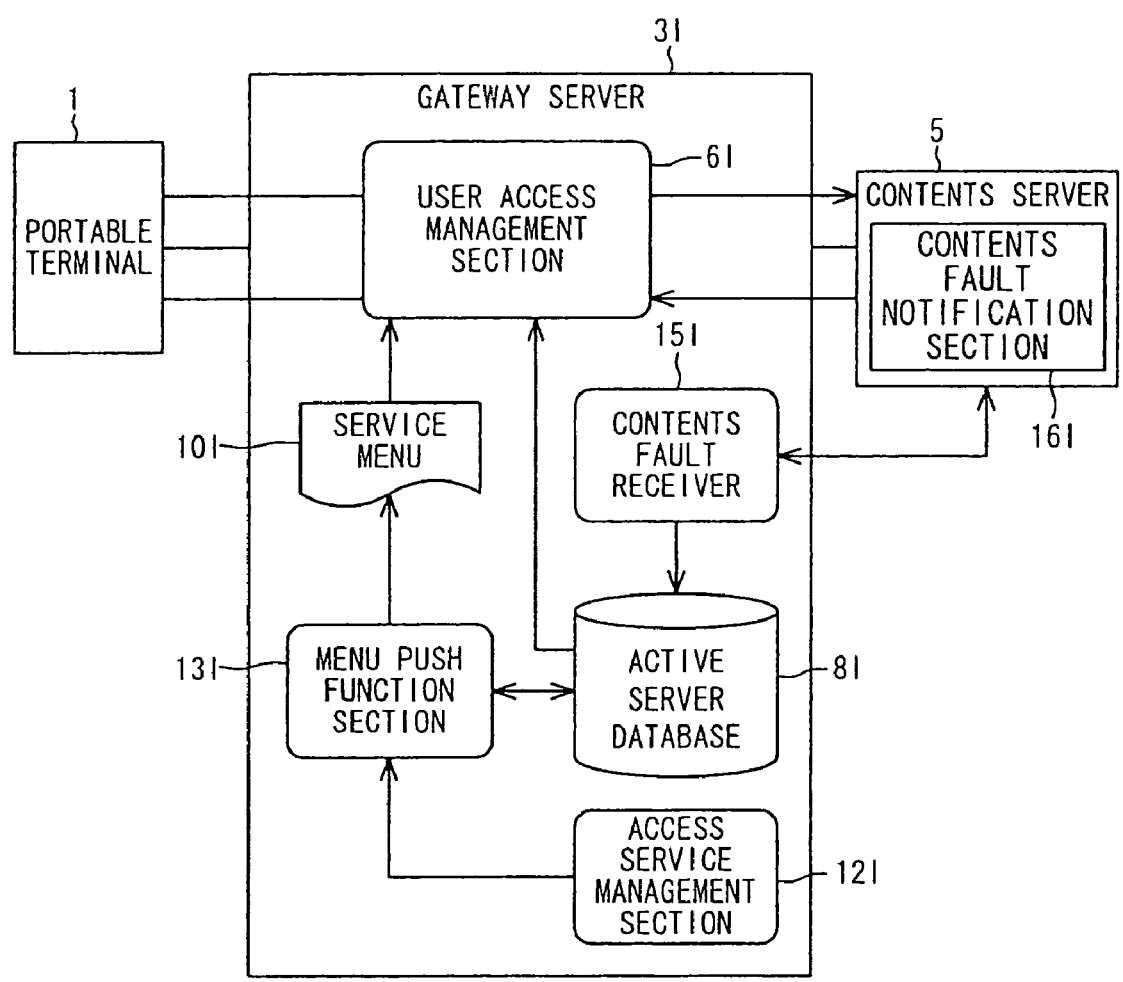
FIG. 24 is a block diagram showing the construction of a variant of the third preferred embodiment of the invention.
Figure 25:
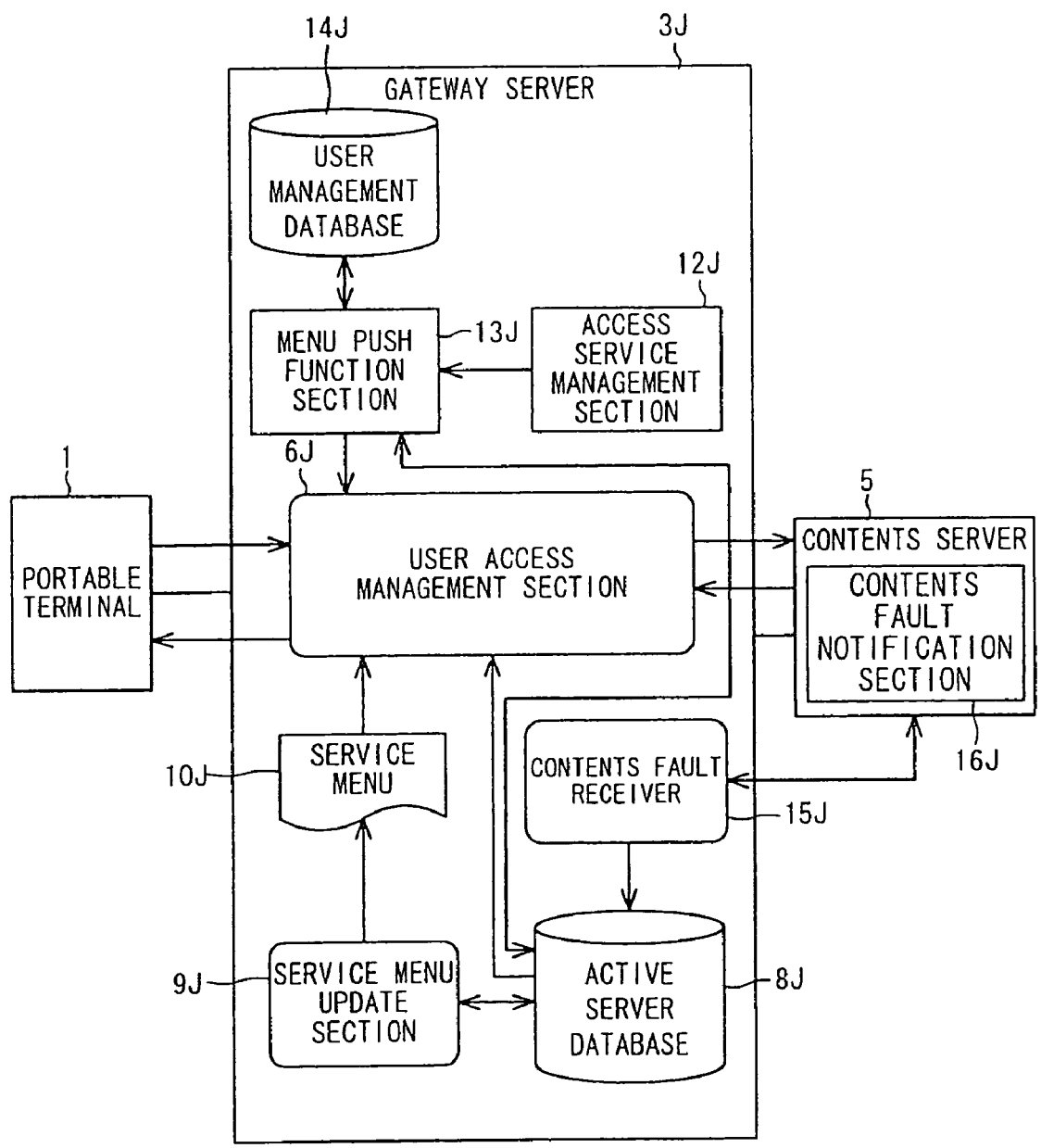
FIG. 25 is a block diagram showing the construction of a variant of the fourth preferred embodiment of the invention.
Figure 26:
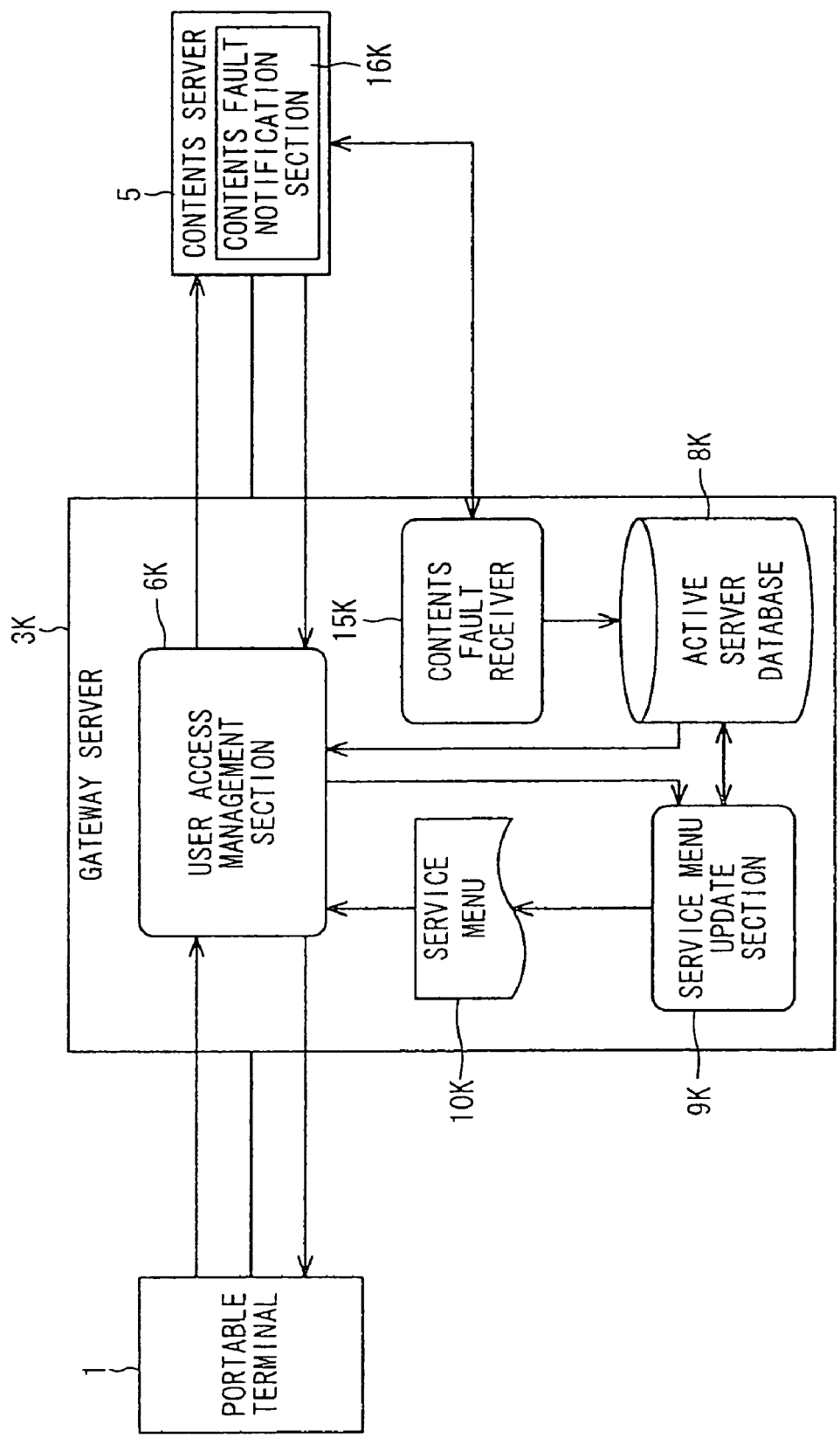
FIG. 26 is a block diagram showing the construction of a variant of the fifth preferred embodiment of the invention.
Figure 27:
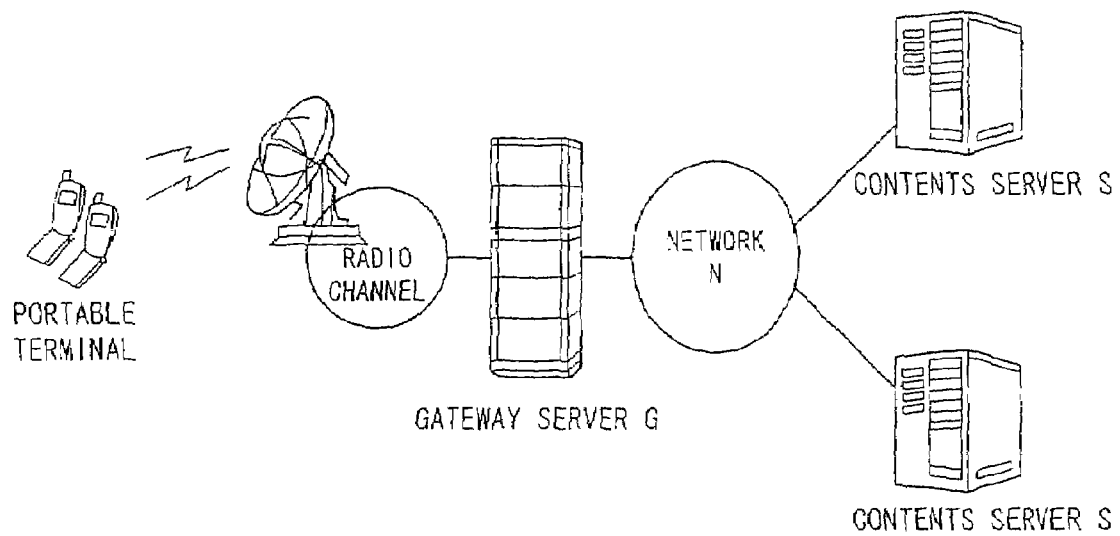
FIG. 27 is a diagram showing the construction of a conventional portable terminal access system.
Figure 28:
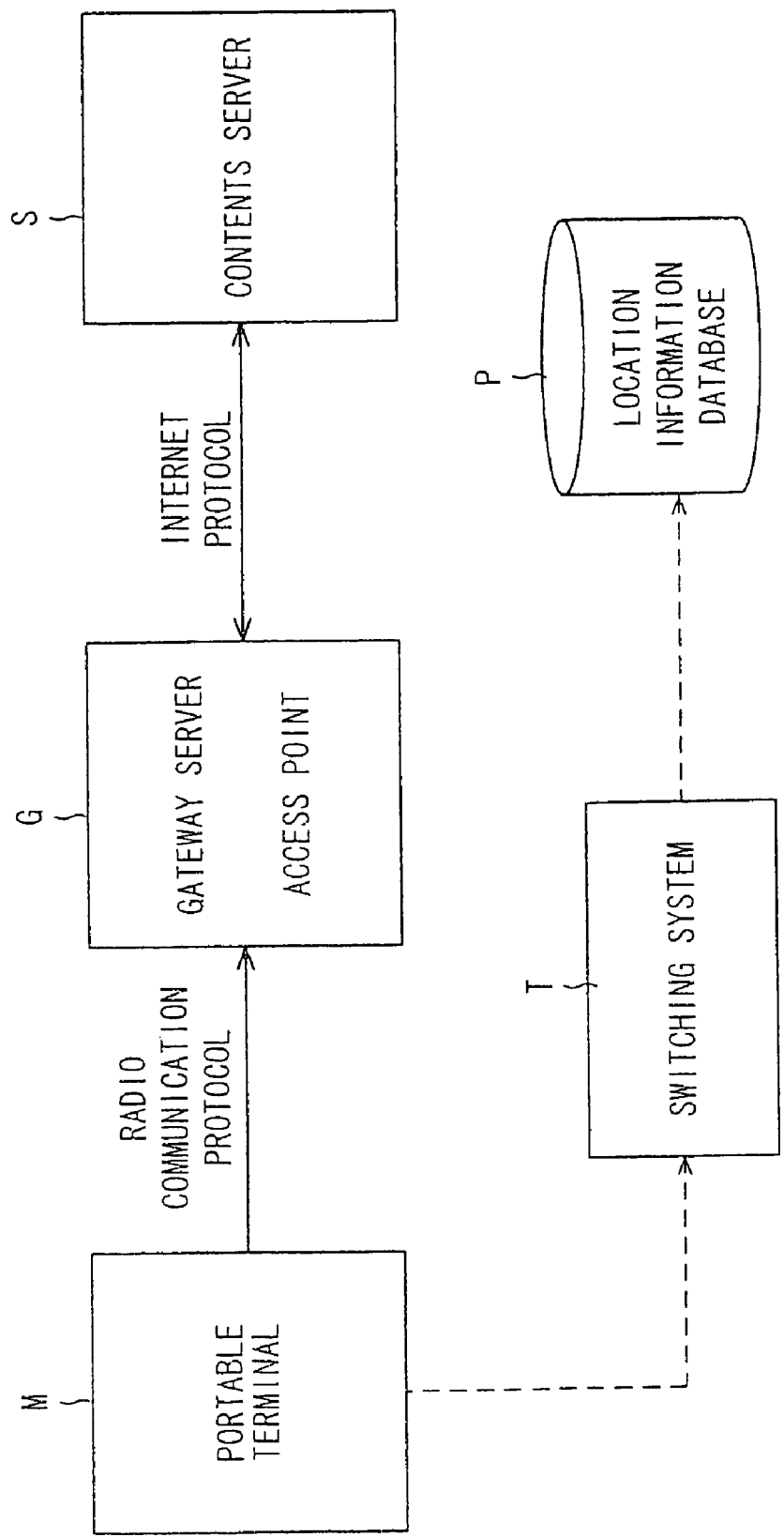
FIG. 28 is a block diagram showing the construction of a conventional portable terminal access system.

Next, the operation of the present preferred embodiment will be explained with reference to the flow chart shown in FIG. 22.

Upon the receipt of an access, wherein a target service is directly designated, from the portable terminal 1 (step S51/YES), the user access management section 6G in the gateway server 3G searches the service state management table held in the server operation database 8G for the implementation status of the designated service (step S52). In this processing, the search is performed using the service state management table shown in FIG. 9 as a search key the service specifying identifier (URL in the present preferred embodiment) designated by the portable terminal 1.

When the implementation status of the service detected from the server operation database 8G indicates that the service is providable (step S53/YES), the user access management section 6G performs connection to the contents server, which provides the service designated by the portable terminal, to establish communication between the portable terminal 1 and the contents server 5 (step S56).

On the other hand, when the implementation status of the service detected from the server operation database 8G indicates that the service is under suspension (step S53/NO), the user access management section 6G makes a request to the service menu update section 9G for the transfer of a menu divided according to the genre that summarizes services which are identical to the designated service in genre and are presently active (step S54).

Upon the acquisition of a requested menu divided according to genre from the service menu update section 9G, the user access management section 6G notifies the portable terminal 1, which has requested the access, of the presently inactive state of the requested service and, at the same time, sends a menu divided according to genre obtained from the service menu update section 9G (step S55).

Upon the notification from the gateway server 3G, the user of the portable terminal 1 can first recognize that the service, which has requested the access, is presently under suspension. Further, the user can obtain the service menu, that summarizes services which belong to the same genre as the service under suspension and, at the same time, are presently active. This makes it possible to avoid a trouble such that services, to which the access has been successively requested by the user, are under suspension.

In all the above-described preferred embodiments, the implementation status of the service is detected by the gateway server, and a service menu is prepared based on the detected implementation status. In the embodiments wherein the gateway server 3 manages, service by service, the implementation status of services provided by contents servers, however, as shown in FIGS. 23, 24, 25, and 26, a construction may also be adopted wherein on a contents server 5' side is provided a contents fault notification section 16 which monitors the implementation status of each contents held in a contents server 5' and, when contents not in a service-providable state have been detected, notifies the gateway server 3 of the occurrence of fault, while on the gateway server 3 side is provided a contents fault receiver 17 for receiving the notification of fault from the contents server 5', whereby contents not in a service-providable state are detected by the contents server side and are notified to the gateway server. Also in this preferred embodiment, the effects as explained above in connection with the above preferred embodiments can be attained.

It should be noted that the invention is not limited to these preferred embodiments and various modifications and variations are possible without departing from the scope of the invention. For example, in the above preferred embodiments, when an inactive contents server has been detected, for the service provided by this contents server, an indication, informing that the service is under suspension, is provided in the service menu. Alternatively, the service, which is not in a providable state, may not be described in the service menu.

As is apparent from the foregoing description, according to the invention, the operation state of contents servers present on a network is periodically detected. Information about the detected operation state of the contents servers is stored in first storage means. The first storage means is searched for the operation state of the contents servers, and, when an inactive contents server has been detected, a service menu is prepared which can recognize services provided by active contents servers. Upon a request from a portable terminal for the acquisition of a service provided by a contents server, the prepared service menu is sent to the portable terminal. This permits a service menu, which can recognize services provided by active contents servers, to be previously presented to the user of the portable terminal prior to the connection of the portable terminal to the network. Thus, unnecessary access to inactive contents servers can be restricted.

Further, since all services provided by service-providable contents servers registered in the repeater are provided as a service menu to the portable terminal, the access of the portable terminal to inactive contents servers can be prevented. Therefore, the disadvantage of the prior art technique can be eliminated wherein, although the operation status of the contents server, to which the access has been requested by the user of the portable terminal, can be recognized, the operation status of other contents servers cannot be recognized.

Furthermore, since the access of inactive contents servers can be restricted, unnecessary exchange of information between the repeater and the contents servers can be reduced.

The detection of the implementation status, indicating, whether or not services realized by data held in contents servers are in a providable or acquisitive state, followed by storage of information about the detected implementation status of each service in the first storage means permits the implementation status of services provided by contents servers to be managed service by service. Therefore, even though a certain service out of a plurality of services provided by a contents server is under suspension, for example, due to rewrite of data, the suspended state of this service can be detected and notified as a service menu to the user of the portable terminal.

Further, in the construction such that the operation state of contents servers or the implementation status, indicating whether or not services realized by data held in contents servers are in a providable or acquisitive state, is detected; a service menu is prepared based on the detected operation state of contents servers or the detected implementation status of services; and the prepared service menu is push-distributed each predetermined time to a portable terminal, a service menu, which can recognize services provided by active contents servers, can be previously presented to the user of the portable terminal before the connection of the portable terminal to the network. This can restrict unnecessary access to inactive contents servers or unnecessary access to services under suspension.

Furthermore, since all services provided by service-providable contents servers registered in the repeater are provided as a service menu to the portable terminal, the access of the portable terminal to inactive contents servers can be prevented. Therefore, the disadvantage of the prior art technique can be eliminated wherein, although the operation status of the contents server, to which the access has been requested by the user of the portable terminal, can be recognized, the operation status of other contents servers cannot be recognized.

Furthermore, since the access of inactive contents servers can be restricted, unnecessary exchange of information between the repeater and the contents servers can be reduced.

In the construction such that a management table, which records, in association with each other, information for identifying portable terminals, to which the service menu is push-distributed, and the cycle of distribution of the service menu to the portable terminals, is provided to count the timing of distribution of the service menu to the portable terminals registered in the management table and then to push-distribute the prepared service menu to a portable terminal which has been judged to be in timing of distribution of the service menu, a service menu, which summarizes utilizable services, can be distributed to only users of portable terminals who wish to receive the push distribution of the service menu.

In the construction such that a management table, which records, in association with each other, information for identifying portable terminals, to which the service menu is push-distributed, and the cycle of distribution of the service menu to the portable terminals, is provided, the timing of the distribution of the service menu to portable terminals registered in the management table is counted, second storage means, which, for each portable terminal registered in the management table, records, in association with each other, information for identifying the portable terminal and specifying information for specifying services of which the implementation status is to be notified as a service menu to the portable terminal, is looked up upon the receipt of the notification of the portable terminal being in the timing of the distribution of the service menu, to acquire the specifying information for specifying services of which the implementation status is to be notified as the service menu to the portable terminal, the first storage means is looked up based on the acquired specifying information to acquire the implementation status of the service indicated by the specifying information and then to prepare a service menu which is then push-distributed to the notified portable terminal, it is possible to distribute, to only users of portable terminals who wish to receive push distribution, a service menu, which summarizes the implementation status of only services desired by the registered users.

In the construction such that an implementation status indicating whether or not services realized by data held in contents servers are in a providable or acquisitive state is detected; information about the detected implementation status of the services is stored in the first storage means; the first storage means is searched for the implementation status of each service; upon the detection of a service not in an acquisitive or providable state by the search, a service menu, which can recognize services in an acquisitive and providable state, is prepared; upon the receipt of a request from the portable terminal for access, wherein the service to be provided by the contents server has been designated, the first storage means is looked up to detect the implementation status of the designated service; when the designated service has been found not to be in a providable or acquisitive state, and a service menu, which summarizes the implementation status of other services belonging to the same genre as the designated service, is prepared and then sent to the portable terminal which requested the access, the user of the portable terminal, upon the notification from the repeater, can first recognize that the service, to which the access has been requested by the user, is presently under suspension. Further, the user can obtain a service menu, that summarizes services which belong to the same genre as the service under suspension and, at the same time, are presently available. Therefore, a trouble can be avoided such that a plurality of services, to which the access has been successively requested by the user, are under suspension.

Further, instead of the detection of fault of contents servers on the repeater side, an alternative construction may be adopted wherein, when a service held by a contents server is not in a service-providable state, for example, due to rewrite of data or the like, the contents server side notifies the repeater of information for specifying the service and the inactive state of the service. Also in this construction, the above effects can be attained, and, in addition, the burden on the repeater can be reduced.

The invention has been described in detail with particular reference to preferred embodiments, but it will be understood that variations and modifications can be effected within the scope of the invention as set forth in the appended claims.

What is claimed is:

1. A repeater for a protocol conversion of a communication protocol in a network, in which contents servers for providing service are present, and a radio communication protocol in a radio communication channel which portable terminals utilize, said repeater comprising:
   detection means for periodically detecting the status of operation of the contents servers present on the network;
   first storage means for holding information about the status of operation of the contents servers detected by the detection means; and
   service menu preparation means which performs the search of the first storage means and, when an inactive contents server has been detected, prepares a service menu which can recognize services provided by active contents servers and a status of inactive contents servers, wherein
   upon a request from a portable terminal for the acquisition of a service provided by a contents server, the service menu prepared by the service menu preparation means is sent to the portable terminal.

2. A repeater for a protocol conversion of a communication protocol in a network, in which contents servers for providing services are present, and a radio communication protocol in a radio communication channel which portable terminals utilize, said repeater comprising:
   detection means for periodically detecting an implementation status indicating whether or not services realized by data held in the contents servers are in a providable or acquisitive state;
   first storage means for holding information about the implementation status of the services detected by the detection means; and
   service menu preparation means which periodically performs the search of the first storage means and, when a service, in a state such that the service cannot be acquired or provided, has been detected, periodically prepares a service menu which can recognize acquisitive and providable services and a status of services that cannot be acquired or provided, wherein
   upon a request from a portable terminal for the acquisition of a service provided by a contents server, the service menu prepared by the service menu preparation means is sent to the portable terminal.

3. A repeater for a protocol conversion of a communication protocol in a network, in which contents servers for providing service are present, and a radio communication protocol in a radio communication channel which portable terminals utilize, said repeater comprising:
- detection means for periodically detecting the status of operation of the contents servers present on the network;
- first storage means for holding information about the status of operation of the contents servers detected by the detection means;
- service menu preparation means which performs the search of the first storage means and, when an inactive contents server has been detected, prepares a service menu which can recognize services provided by active contents servers and a status of inactive contents servers;
- time-counting means for counting the timing of distribution of the service menu prepared by the service menu preparation means to the portable terminals; and
- push distribution means for push-distributing the service menu to the portable terminal for which a predetermined time has been counted by the time-counting means.

4. A repeater for a protocol conversion of a communication protocol in a network, in which contents servers for providing services are present, and a radio communication protocol in a radio communication channel which portable terminals utilize, said repeater comprising:
- detection means for detecting an implementation status indicating whether or not services realized by data held in the contents servers are in a providable or acquisitive state;
- first storage means for holding information about the implementation status of the services detected by the detection means;
- service menu preparation means which performs the search of the first storage means and, when a service not in an acquisitive or providable state has been detected, prepares a service menu which can recognize acquisitive and providable services and a status of services that cannot be acquired or provided;
- time-counting means for counting the timing of distribution of the service menu prepared by the service menu preparation means to the portable terminals; and
- push distribution means for push-distributing the service menu to the portable terminal for which a predetermined time has been counted by the time-counting means.

5. The repeater according to claim 1, which further comprises:
- time-counting means that has a management table, which records, in association with each other information for identifying a portable terminal, to which the service menu is push-distributed, and a cycle of the distribution of the service menu to the portable terminal, and counts the timing of the distribution of the service menu to portable terminals cataloged in the management table; and
- push distribution means for push-distributing the service menu prepared by the service menu preparation means to the portable terminal which has been judged by the time-counting means to be in the timing of distribution of the service menu.

6. The repeater according to claim 1, which further comprises:
- time-counting means that has a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table;
- second storage means which, for each portable terminal cataloged in the management table, records, in association with each other, information for identifying portable terminals and specifying information for specifying services of which the implementation status is to be notified as a service menu to the portable terminal; and
- push distribution means that, upon the receipt, from the time-counting means, of the notification of the portable terminal being in the timing of the distribution of the service menu, refers to the second storage means, acquires from the second storage means the specifying information for specifying services of which the implementation status is to be notified as the service menu to the portable terminal, refers to the first storage means based on the acquired specifying information, acquires from the first storage means the implementation status of the services indicated by the specifying information to prepare a service menu, and then push-distributes the prepared service menu to the portable terminal notified by the time-counting means.

7. A repeater for a protocol conversion of a communication protocol in a network, in which contents servers for providing services are present, and a radio communication protocol in a radio communication channel which portable terminals utilize, said repeater comprising:
- detection means for periodically detecting an implementation status indicating whether or not services realized by data held in the contents server are in a providable or acquisitive state;
- first storage means for holding information about the implementation status of the services detected by the detection means;
- service menu preparation means which periodically performs the search of the first storage means and, when a service not in an acquisitive or providable state has been detected, periodically prepares a service menu which can recognize acquisitive and providable services and a status of services that cannot be acquired or provided; and
- control means for controlling each means in such a manner that, upon a request for the acquisition of a service, provided by the contents server, from the portable terminal, sends the service menu prepared by the service menu preparation means to the portable terminal, wherein
- upon the receipt of a request from the portable terminal for access, wherein the service provided by the contents server has been designated, the control means refers to the first storage means to detect the implementation status of the designated service and, when the designated service is not in a providable or acquisitive state, sends a service menu, which summarizes the implementation status of other services belonging to the same genre as the designated service, to the portable terminal which has requested the access.

8. A mobile radio communication system comprising:
- portable terminals for performing communication through a radio communication channel;
- contents servers which are present on a network and store information; and
- a repeater for a protocol conversion of a communication protocol in a network, in which the contents servers are present, and a radio communication protocol in a radio communication channel which the portable terminals utilize, wherein the contents server has notification means for periodically checking whether a service realized by data held in the contents server is inactive and for notifying the repeater of the inactive state of the service together with specifying information for specifying the service, and the repeater comprises receive means for receiving information notified by the notification means, first storage means for holding information about the implementation status of each service received by the receive means, and service menu preparation means which periodically performs the search of the first storage means and, when a service not in a providable state has been detected, prepares a service menu which can recognize providable services and a status of the services that cannot be provided, wherein upon a request from the portable terminal for the acquisition of a service provided by a contents server, the service menu prepared by the service menu preparation means is sent to the portable terminal.

9. A mobile radio communication system comprising:

portable terminals for performing communication through a radio communication channel;

contents servers which are present on a network and stores information; and a repeater for a protocol conversion of a communication protocol in a network, in which the contents servers are present, and a radio communication protocol in a radio communication channel which the portable terminals utilize, wherein the contents server has notification means that, when a service realized by data held in the contents server is inactive, notifies the repeater of the inactive state of the service together with specifying information for specifying the service, and the repeater comprises receive means for receiving information notified by the notification means, first storage means for holding information about the implementation status of each service received by the receive means, and service menu preparation means which performs the search of the first storage means and, when a service not in a providable state has been detected, prepares a service menu which can recognize providable services and a status of the services that cannot be provided, time-counting means for counting the timing of distribution of the service menu prepared by the service menu preparation means to the portable terminals, and push distribution means for push-distributing the service menu to the portable terminal for which a predetermined time has been counted by the time-counting means.

10. The mobile radio communication system according to claim 8, which further comprises:

time-counting means that has a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table; and push distribution means for push-distributing the service menu prepared by the service menu preparation means to the portable terminal which has been judged by the time-counting means to be in the timing of distribution of the service menu.

11. The mobile radio communication system according to claim 8, which further comprises:

time-counting means that has a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table;

second storage means which, for each portable terminal cataloged in the management table, records, in association with each other, information for identifying the portable terminal and specifying information for specifying services of which the implementation status is to be notified as a service menu to the portable terminal; and push distribution means that, upon the receipt, from the time-counting means, of the notification of the portable terminal being in the timing of the distribution of the service menu, refers to the second storage means, acquires from the second storage means the specifying information for specifying services of which the implementation status is to be notified as the service menu to the portable terminal, refers to the first storage means based on the acquired specifying information, acquires from the first storage means the implementation status of the services indicated by the specifying information to prepare a service menu, and then push-distributes the prepared service menu to the portable terminal notified by the time-counting means.

12. A mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, wherein the contents server has notification means for periodically checking whether a service realized by data held in the contents server is inactive and for notifying the repeater of the inactive state of the service together with specifying information for specifying the service, and the repeater comprises receive means for receiving information notified by the notification means, first storage means for holding information about the implementation status of each service received by the receive means, service menu preparation means which periodically performs the search of the first storage means and, when a service not in a providable state, has been detected, periodically prepares a service menu which can recognize providable services and a status of the services that cannot be provided, and control means for controlling each means in such a manner that, upon a request for the acquisition of a service, provided by the contents server, from the portable terminal, sends the service menu prepared by the service menu preparation means to the portable terminal, wherein upon the receipt of a request from the portable terminal for access, wherein the service provided by the contents server has been designated, the control means refers to the first storage means to detect the implementation status of the designated service and, when the designated service is not in a providable state, sends a service menu, which summarizes the implementation status of other services belonging to the same genre as the designated service, to the portable terminal which has requested the access.

13. A fault notification method for a repeater for a protocol conversion of a communication protocol in a network, in which contents servers for providing services are present, and a radio communication protocol in a radio communication channel which portable terminals utilize, said method comprising the steps of:

periodically detecting the status of operation of the contents servers present on the network (detection step);

storing in first storage means information about the status of operation of the contents servers detected by the detection step (store step);

searching the first storage means for the status of operation of the contents servers (search step);

when an inactive contents server has been detected by the search step, preparing a service menu which can recognize services provided by active contents servers (first service menu preparation step) and a status of inactive contents servers; and upon a request from a portable terminal for the acquisition of a service provided by a contents server, sending the service menu prepared by the first service menu preparation step to the portable terminal (send step).

14. A fault notification method for a repeater for a protocol conversion of a communication protocol in a network, in which contents servers for providing services are present, and a radio communication protocol in a radio communication channel which portable terminals utilize, said method comprising the steps of:

periodically detecting an implementation status indicating whether or not services realized by data held in the contents servers are in a providable or acquisitive state (detection step);

storing in first storage means information about the implementation status of the services detected by the detection step (store step);

periodically searching the first storage means for the implementation status of each service (search step);

when a service not in an acquisitive or providable state has been detected by the search step, periodically preparing a service menu which can recognize acquisitive and providable services (first service menu preparation step) and a status of the services that cannot be provided; and upon a request from a portable terminal for the acquisition of a service provided by a contents server, sending the service menu prepared by the first service menu preparation step to the portable terminal (send step).

15. A fault notification method for a repeater for a protocol conversion of a communication protocol in a network, in which contents servers for providing services are present, and a radio communication protocol in a radio communication channel which portable terminals utilize, said method comprising the steps of:

periodically detecting the status of operation of the contents servers present on the network (detection step);

storing in first storage means information about the status of operation of the contents servers detected by the detection step (store step);

searching the first storage means for the status of operation of the contents servers (search step);

when an inactive contents server has been detected by the search step, preparing a service menu which can recognize services provided by active contents servers (first service menu preparation step) and a status of inactive contents servers;

counting the timing of distribution of the service menu prepared by the first service menu preparation step to the portable terminals (time-counting step); and push-distributing the service menu to the portable terminal for which a predetermined time has been counted by the time-counting step (push distribution step).

16. A fault notification method for a repeater for a protocol conversion of a communication protocol in a network, in which contents servers for providing services are present, and a radio communication protocol in a radio communication channel which portable terminals utilize, said method comprising the steps of:

detecting whether or not services realized by data held in the contents servers are in a providable or acquisitive state (detection step);

storing in first storage means information about the status of the services detected by the detection step (store step);

searching the first storage means for the implementation status of each service (search step);

when a service not in an acquisitive or providable state has been detected by the search step, preparing a service menu which can recognize acquisitive and providable services (first service menu preparation step) and a status of services that cannot be acquired or provided;

counting the timing of distribution of the service menu prepared by the first service menu preparation step to the portable terminals (time-counting step); and push-distributing the service menu to the portable terminal for which a predetermined time has been counted by the time-counting step (push distribution step).

17. The fault notification method according to claim 13, which further comprises the steps of:

providing a management table, which records, in association with each other, information for identifying a portable terminal, to which the service menu is push-distributed, and a cycle of the distribution of the service menu to the portable terminal, and counting the timing of the distribution of the service menu to portable terminals cataloged in the management table (time-counting step); and push-distributing the service menu prepared by the first service menu preparation step to the portable terminal which has been judged by the time-counting step to be in the timing of distribution of the service menu (push distribution step).

18. The fault notification method according to claim 13, which further comprises the steps of:

providing a management table, which records, in association with each other, information for identifying a portable terminal, to which the service menu is push-distributed, and a cycle of the distribution of the service menu to the portable terminal, and counting the timing of the distribution of the service menu to portable terminals cataloged in the management table (time-counting step);

upon the receipt, from the time-counting step, of the notification of the portable terminal being in the timing of the distribution of the service menu, looking up second storage means, which, for each portable terminal cataloged in the management table, records, in association with each other, information for identifying the portable terminal and specifying information for specifying services of which the implementation status is to be notified as a service menu to the portable terminal, and acquiring from the second storage means the specifying information for specifying services of which the implementation status is to be notified as the service menu to the portable terminal (acquisition step);

looking up the first storage means based on the specifying information acquired by the acquisition step and acquiring from the first storage means the implementation status of the services indicated by the specifying information to prepare a service menu (second service menu preparation step); and push-distributing the service menu prepared by the second service menu preparation step to the portable terminal notified by the time-counting step (push distribution step).

19. A fault notification method for a repeater for a protocol conversion of a communication protocol in a network, in which contents servers for providing services are present, and a radio communication protocol in a radio communication channel which portable terminals utilize, said method comprising the steps of:

periodically detecting an implementation status indicating whether or not services realized by data held in the contents servers are in a providable or acquisitive state (detection step);

storing in first storage means information about the implementation status of the services detected by the detection step (store step);

periodically searching the first storage means for the implementation status of each service (search step);

when a service not in an acquisitive or providable state has been detected by the search step, periodically preparing a service menu which can recognize acquisitive and providable services (first service menu preparation step) and a status of the services that cannot be provided;

upon the receipt of a request from a portable terminal for access, wherein the service provided by the contents server has been designated, looking up the first storage means to detect the implementation status of the designated service (second detection step);

when the result of the detection by the second detection step is such that the designated service not in a providable or acquisitive state, preparing a service menu, which summarizes the implementation status of other services belonging to the same genre as the designated service (third service menu preparation step); and sending the service menu prepared by the third service menu preparation step to the portable terminal which has requested the access (second send step).

20. A fault notification method for a mobile radio communication system comprising:

portable terminals for performing communication through a radio communication channel;

contents servers which are present on a network and stores information; and a repeater for a protocol conversion of a communication protocol in a network, in which the contents servers are present, and a radio communication protocol in a radio communication channel which the portable terminals utilize, said method comprising the steps of:

periodically checking whether a service realized by data held in the contents server is inactive, and notifying the repeater of the inactive state of the service together with specifying information for specifying the service (notification step);

receiving in the repeater information notified by the notification step (receive step);

storing in first storage means information about the implementation status of each service received by the receive step (store step);

periodically searching the first storage means for the implementation status of each service (search step);

when a service not in a providable state has been detected by the search step, periodically preparing a service menu which can recognize providable services (first service menu preparation step) and a status of the services that cannot be provided; and upon a request from a portable terminal for the acquisition of a service provided by a contents server, sending the service menu prepared by the first service menu preparation step to the portable terminal (send step).

21. A fault notification method for a mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, said method comprising the steps of:

when a service realized by data held in the contents server is inactive, notifying the repeater of the inactive state of the service together with specifying information for specifying the service (notification step);

receiving in the repeater information notified by the notification step (receive step);

storing in first storage means information about the implementation status of each service received by the receive step (store step);

searching the first storage means for the implementation status of each service (search step);

when a service not in a providable state has been detected by the search step, preparing a service menu which can recognize providable services (first service menu preparation step) and a status of the services that cannot be provided;

counting the timing of distribution of the service menu prepared by the first service menu preparation step to the portable terminal (time-counting step); and push-distributing the service menu to the portable terminal for which a predetermined time has been counted by the time-counting step (push distribution step).

22. The fault notification method for mobile radio communication system according to claim 20, which further comprises the steps of:

providing a first management table, which records, in association with each other, information for identifying a portable terminal, to which the service menu is push-distributed, and a cycle of the distribution of the service menu to the portable terminal, and counting the timing of the distribution of the service menu to portable terminals cataloged in the first management table (time-counting step); and push-distributing the service menu prepared by the first service menu preparation step to the portable terminal which has been judged by the time-counting step to be in the timing of distribution of the service menu (push distribution step).

23. The fault notification method for mobile radio communication system according to claim 20, which further comprises the steps of:

providing a management table, which records, in association with each other, information for identifying a portable terminal, to which the service menu is push-distributed, and a cycle of the distribution of the service menu to the portable terminal, and counting the timing of the distribution of the service menu to portable terminals cataloged in the management table (time-counting step);

upon the receipt, from the time-counting step, of the notification of the portable terminal being in the timing of the distribution of the service menu, looking up second storage means, which, for each portable terminal cataloged in the management table, records, in association with each other, information for identifying the portable terminal and specifying information for specifying services of which the implementation status is to be notified as a service menu to the portable terminal, and acquiring from the second storage means the specifying information for specifying services of which the implementation status is to be notified as the service menu to the portable terminal (acquisition step);

looking up the first storage means based on the specifying information acquired by the acquisition step and acquiring from the first storage means the implementation status of the services indicated by the specifying information to prepare a service menu (second service menu preparation step); and push-distributing the service menu prepared by the second service menu preparation step to the portable terminal notified by the time-counting step (push distribution step).

24. A fault notification method for a mobile radio communication system comprising:

portable terminals for performing communication through a radio communication channel;

contents servers which are present on a network and stores information; and a repeater for a protocol conversion of a communication protocol in a network, in which the contents servers are present, and a radio communication protocol in a radio communication channel which the portable terminals utilize, said method comprising the steps of:

periodically checking whether a service realized by data held in the contents server is inactive, and notifying the repeater of the inactive state of the service together with specifying information for specifying the service (notification step);

receiving in the repeater information notified by the notification step (receive step);

storing in first storage means information about the implementation status of each service received by the receive step (store step);

periodically searching the first storage means for the implementation status of each service (search step);

when a service, in a state such that the service cannot be acquired or provided, has been detected by the search step, periodically preparing a service menu which can recognize acquisitive and providable services (first service menu preparation step) and a status of services that cannot be acquired or provided;

upon the receipt of a request from a portable terminal for access, wherein the service provided by the contents server has been designated, looking up the first storage means to detect the implementation status of the designated service (second detection step);

when the result of the detection by the second detection step is such that the designated service is not in a providable or acquisitive state, preparing a service menu, which summarizes the implementation status of other services belonging to the same genre as the designated service (third service menu preparation step); and sending the service menu prepared by the third service menu preparation step to the portable terminal which has requested the access (second send step).

25. A computer readable recording medium having, recorded thereon, a fault notification program for a repeater for a protocol conversion of a communication protocol in a network, in which contents servers for providing service are present, and a radio communication protocol in a radio communication channel which portable terminals utilize, said recording medium having, recorded thereon, a program for executing:

detection processing for periodically detecting the status of operation of the contents servers present on the network;

store processing for storing in first storage means information about the status of operation of the contents servers detected by the detection processing;

search processing for searching the first storage means for the status of operation of the contents servers;

first service menu preparation processing which, when an inactive contents server has been detected by the search processing, prepares a service menu which can recognize services provided by active contents servers and a status of the services that cannot be provided; and send processing which, upon a request from a portable terminal for the acquisition of a service provided by a contents server, sends the service menu prepared by the first service menu preparation processing to the portable terminal.

26. A computer readable recording medium having, recorded thereon, a fault notification program for a repeater for a protocol conversion of a communication protocol in a network, in which contents servers for providing services are present, and a radio communication protocol in a radio communication channel which portable terminals utilize, said recording medium having, recorded thereon, a program for executing:

detection processing for periodically detecting an implementation status indicating whether or not services realized by data held in the contents server are in a providable or acquisitive state;

store processing for storing in first storage means information about the implementation status of the services detected by the detection processing;

search processing for periodically searching the first storage means for the implementation status of each service;

first service menu preparation processing which, when a service not in an acquisitive or providable state has been detected by the search processing, periodically prepares a service menu which can recognize acquisitive and providable services and a status of services that cannot be acquired or provided; and send processing which, upon a request from a portable terminal for the acquisition of a service provided by a contents server, sends the service menu prepared by the first service menu preparation processing to the portable terminal.

27. A computer readable recording medium having, recorded thereon, a fault notification program for a repeater for a protocol conversion of a communication protocol in a network, in which a contents servers for providing services are present, and a radio communication protocol in a radio communication channel which a portable terminals utilize, said recording medium having, recorded thereon, a program for executing:
   detection processing for periodically detecting the status of operation of the contents servers present on the network;
   store processing for storing in first storage means information about the status of operation of the contents servers detected by the detection processing;
   search processing for searching the first storage means for the status of operation of the contents server;
   first service menu preparation processing which, when an inactive contents server has been detected by the search processing, prepares a service menu which can recognize services provided by active contents servers and a status of inactive contents servers;
   time-counting processing for counting the timing of distribution of the service menu prepared by the first service menu preparation processing to the portable terminals; and
   push distribution processing for push-distributing the service menu to the portable terminal for which a predetermined time has been counted by the time-counting processing.

28. A computer readable recording medium having, recorded thereon, a fault notification program for a repeater for a protocol conversion of a communication protocol in a network, in which contents servers for providing services are present, and a radio communication protocol in a radio communication channel which portable terminals utilize, said recording medium having, recorded thereon, a program for executing:
   detection processing for detecting whether or not services realized by data held in the contents server are in a providable or acquisitive state;
   store processing for storing in first storage means information about the status of the services detected by the detection processing;
   search processing for searching the first storage means for the implementation status of each service;
   first service menu preparation processing which, when a service not in an acquisitive or providable state has been detected by the search processing, prepares a service menu which can recognize acquisitive or providable services and a status of services that cannot be acquired or provided;
   time-counting processing for counting the timing of distribution of the service menu prepared by the first service menu preparation processing to the portable terminals; and
   push distribution processing for push-distributing the service menu to the portable terminal for which a predetermined time has been counted by the time-counting processing.

29. The computer readable recording medium having, recorded thereon, a fault notification program for a repeater according to claim 25, wherein said program further executes:
   time-counting processing which refers to a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table; and
   push distribution processing for push-distributing the service menu prepared by the first service menu preparation processing to the portable terminal which has been judged by the time-counting processing to be in the timing of distribution of the service menu.

30. The computer readable recording medium having, recorded thereon, a fault notification program for a repeater according to claim 25, wherein said program further executes:
   time-counting processing which refers to a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table;
   acquisition processing which, upon the receipt, from the time-counting processing, of the notification of the portable terminal being in the timing of the distribution of the service menu, looking up second storage means, which, for each portable terminal cataloged in the management table, records, in association with each other, information for identifying the portable terminal and specifying information for specifying services of which the implementation status is to be notified as a service menu to the portable terminal, and acquiring from the second storage means the specifying information for specifying services of which the implementation status is to be notified as the service menu to the portable terminal;
   second service menu preparation processing which looks up the first storage means based on the specifying information acquired by the acquisition processing and acquires from the first storage means the implementation status of the services indicated by the specifying information to prepare a service menu; and
   push distribution processing for push-distributing the service menu prepared by the second service menu preparation processing to the portable terminal notified by the time-counting processing.

31. A computer readable recording medium having, recorded thereon, a fault notification program for a repeater for a protocol conversion of a communication protocol in a network, in which contents servers for providing services are present, and a radio communication protocol in a radio communication channel which portable terminals utilize, said recording medium having, recorded thereon, a program for executing:
   detection processing for periodically detecting an implementation status indicating whether or not services realized by data held in the contents server are in a providable or acquisitive state;
   store processing for storing in first storage means information about the implementation status of the services detected by the detection processing;
   search processing for periodically searching the first storage means for the implementation status of each service;

first service menu preparation processing which, when a
service not in an acquisitive or providable state has
been detected by the search processing, periodically
prepares a service menu which can recognize acquisitive and providable services and a status of services that
cannot be acquired or provided;
second detection processing which, upon the receipt of a
request from a portable terminal for access, wherein the
service provided by the contents server has been designated, looks up the first storage means to detect the
implementation status of the designated service;
third service menu preparation processing which, when
the designated service detected by the second detection
processing is not in a providable or acquisitive state,
prepares a service menu, which summarizes the implementation status of other services belonging to the
same genre as the designated service; and
second send processing for sending the service menu
prepared by the third service menu preparation processing to the portable terminal which has requested the
access.

32. A computer readable recording medium having, recorded thereon, a fault notification program for a mobile radio communication system comprising:
portable terminals for performing communication through a radio communication channel;
contents servers which are present on a network and store information; and
a repeater for a protocol conversion of a communication protocol in a network, in which the contents servers are present, and a radio communication protocol in a radio communication channel which the portable terminals utilize, said recording medium having, recorded thereon, a program for executing:
notification processing for periodically checking whether a service realized by data held in the contents server is inactive, and notifying the repeater of the inactive state of the service together with specifying information for specifying the service;
receive processing for receiving in the repeater information notified by the notification processing;
store processing for storing in first storage means information about the implementation status of each service received by the receive processing;
search processing for periodically searching the first storage means for the implementation status of each service;
first service menu preparation processing which, when a service not in a providable state has been detected by the search processing, periodically prepares a service menu which can recognize providable services and a status of the services that cannot be provided; and
send processing which, upon a request from a portable terminal for the acquisition of a service provided by a contents server, sends the service menu prepared by the first service menu preparation processing to the portable terminal.

33. A computer readable recording medium having, recorded thereon, a fault notification program for a mobile radio communication system comprising:
portable terminals for performing communication through a radio communication channel;
contents servers which are present on a network and store information; and
a repeater for a protocol conversion of a communication protocol in a network, in which the contents servers are present, and a radio communication protocol in a radio communication channel which the portable terminals utilize, said recording medium having, recorded thereon, a program for executing:
notification processing which, when a service realized by data held in the contents server is inactive, notifies the repeater of the inactive state of the service together with specifying information for specifying the service;
receive processing for receiving in the repeater information notified by the notification processing;
store processing for storing in first storage means information about the implementation status of each service received by the receive processing;
search processing for searching the first storage means for the implementation status of each service;
first service menu preparation processing which, when a service not in a providable state has been detected by the search processing, prepares a service menu which can recognize providable services and a status of the services that cannot be provided;
time-counting processing for counting the timing of distribution of the service menu prepared by the first service menu preparation processing to the portable terminals; and
push distribution processing for push-distributing the service menu to the portable terminal for which a predetermined time has been counted by the time-counting processing.

34. The computer readable recording medium having, recorded thereon, a fault notification program for a mobile radio communication system according to claim 32, wherein the program further executes:
time-counting processing which refers to a first management table, which records, in association with each other, information for identifying a portable terminal, to which the service menu is push-distributed, and a cycle of the distribution of the service menu to the portable terminal, and counts the timing of the distribution of the service menu to portable terminals cataloged in the first management table; and
push distribution processing for push-distributing the service menu prepared by the first service menu preparation processing to the portable terminal which has been judged by the time-counting processing to be in the timing of distribution of the service menu.

35. The computer readable recording medium having, recorded thereon, a fault notification program for a mobile radio communication system according to claim 32, wherein the program further executes:
time-counting processing which refers to a management table, which records, in association with each other, information for identifying a portable terminal, to which the service menu is push-distributed, and a cycle of the distribution of the service menu to the portable terminal, and counts the timing of the distribution of the service menu to portable terminals cataloged in the management table;
acquisition processing which, upon the receipt, from the time-counting processing, of the notification of the portable terminal being in the timing of the distribution of the service menu, looks up second storage means, which, for each portable terminal cataloged in the management table, records, in association with each Other, information for identifying the portable terminal and specifying information for specifying services of which the implementation status is to be notified as a service menu to the portable terminal, and acquires from the second storage means the specifying information for specifying services of which the implementation status is to be notified as the service menu to the portable terminal;

second service menu preparation processing which looks up the first storage means based on the specifying information acquired by the acquisition processing and acquires from the first storage means the implementation status of the services indicated by the specifying information to prepare a service menu; and push distribution processing for push-distributing the service menu prepared by the second service menu preparation processing to the portable terminal notified by the time-counting processing.

36. A computer readable recording medium having, recorded thereon, a fault notification program for a mobile radio communication system comprising:

portable terminals for performing communication through a radio communication channel;

contents servers which are present on a network and store information; and a repeater for a protocol conversion of a communication protocol in a network, in which the contents servers are present, and a radio communication protocol in a radio communication channel which the portable terminals utilize, said recording medium having, recorded thereon, a program for executing:

notification processing for periodically determining whether a service realized by data held in the contents server is inactive, and notifying the repeater of the inactive state of the service together with specifying information for specifying the service;

receive processing for receiving in the repeater information notified by the notification processing;

store processing storing in first storage means information about the implementation status of each service received by the receive processing;

search processing for periodically searching the first storage means for the implementation status of each service;

first service menu preparation processing which, when a service not in an acquisitive or providable state has been detected by the search processing, periodically prepares a service menu which can recognize acquisitive and providable state and a status of services that cannot be acquired or provided;

second detection processing which, upon the receipt of a request from a portable terminal for access, wherein the service provided by the contents server has been designated, looks up the first storage means to detect the implementation status of the designated service;

third service menu preparation processing which, when the result of the detection by the second detection processing is such that the designated service is not in a providable or acquisitive state, prepares a service menu, which summarizes the implementation status of other services belonging to the same genre as the designated service; and second send processing for sending the service menu prepared by the third service menu preparation processing to the portable terminal which has requested the access.

37. The repeater of claim 1, wherein said service preparation means periodically prepares the service menu.

38. The repeater of claim 2, wherein the service menu also includes the service that cannot be acquired or provided and an indication for each service listed in the menu whether the service can be acquired or provided.

* * * * *